(12) United States Patent
Xie et al.

(10) Patent No.: US 12,541,467 B2
(45) Date of Patent: Feb. 3, 2026

(54) DATA ACCESS METHOD AND DATA ACCESS DEVICE

(71) Applicant: SUZHOU METABRAIN INTELLIGENT TECHNOLOGY CO., LTD., Jiangsu (CN)

(72) Inventors: Zhiyong Xie, Jiangsu (CN); Rengang Li, Jiangsu (CN); Chuang Zhang, Jiangsu (CN); Hongxiang Shen, Jiangsu (CN); Min Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/115,990

(22) PCT Filed: Mar. 15, 2024

(86) PCT No.: PCT/CN2024/082025
§ 371 (c)(1),
(2) Date: Mar. 27, 2025

(87) PCT Pub. No.: WO2024/260039
PCT Pub. Date: Dec. 26, 2024

(65) Prior Publication Data
US 2025/0265198 A1    Aug. 21, 2025

(30) Foreign Application Priority Data
Jun. 20, 2023    (CN) .......................... 202310735218.0

(51) Int. Cl.
*G06F 12/1045*    (2016.01)
*G06F 12/02*    (2006.01)
(Continued)

(52) U.S. Cl.
CPC ...... *G06F 12/1054* (2013.01); *G06F 12/0246* (2013.01); *G06F 12/0891* (2013.01); *G06F 13/1668* (2013.01)

(58) Field of Classification Search
CPC ............ G06F 12/1054; G06F 12/0246; G06F 12/0891; G06F 13/1668
See application file for complete search history.

(56) References Cited

U.S. PATENT DOCUMENTS

2021/0096984 A1*    4/2021    Luo ..................... G06F 13/1668
2022/0075713 A1*    3/2022    Yoon .................... G06F 9/30101
(Continued)

FOREIGN PATENT DOCUMENTS

CN        105579977 A    5/2016
CN        105580010 A    5/2016
(Continued)

OTHER PUBLICATIONS

Chen, Haogang et al., "Remote Disk Cache for Virtual Machines". Journal of Frontiers of Computer Science and Technology. Dec. 15, 2010 (Dec. 15, 2010).
(Continued)

*Primary Examiner* — Tasnima Matin
(74) *Attorney, Agent, or Firm* — Scully, Scott, Murphy & Presser, P.C.

(57) ABSTRACT

Provided are a data access method and a data access device. The method includes: obtaining a first start physical address to be accessed by a processor in a first device and a length of a physical address to be accessed; determining, according to a predetermined first mapping relationship and the first start physical address, a second start virtual address corresponding to a target memory space; and sending a data access request to a second device.

20 Claims, 10 Drawing Sheets

(51) Int. Cl.
*G06F 12/0891* (2016.01)
*G06F 13/16* (2006.01)

(56) References Cited

U.S. PATENT DOCUMENTS

2022/0091988 A1* 3/2022 Tomlin ................ G06F 12/0891
2023/0267081 A1* 8/2023 Joseph ................ G06F 12/0862
 711/118

FOREIGN PATENT DOCUMENTS

| CN | 109710544 A | 5/2019 |
| CN | 115687178 A | 2/2023 |
| CN | 115794669 A | 3/2023 |
| CN | 115827502 A | 3/2023 |
| CN | 116483738 A | 7/2023 |
| WO | 2016082191 A1 | 6/2016 |
| WO | 2020154924 A1 | 8/2020 |
| WO | 2023066268 A1 | 4/2023 |

OTHER PUBLICATIONS

Xiao, Jianqing et al., "Design of Memory Management Unit in Sparc V8 Processor". Science Technology and Engineering. Vol. 10, No. 31. Nov. 8, 2010 (Nov. 8, 2010).
The first search report of CN application No. 202310735218.0 Issued on Jul. 26, 2023.
The search report of PCT application No. PCT/CN2024/082025 issue on May 22, 2024.
The second search report of CN application No. 202310735218.0 issued on Aug. 9, 2023.
The first Office Action of CN 202310735218.0 issued on Jul. 28, 2023.

* cited by examiner

First mapping relationship

| Start_addr=0011, Start physical address | 20 | Host_ip 1 | port1 | Start_vaddr=1001 | 20 |
|---|---|---|---|---|---|
| Start_addr=0041, Start physical address | 40 | Host_ip 1 | port1 | Start_vaddr=1001 | 40 |
| Start_addr=0081, Start physical address | 40 | Host_ip 1 | port1 | Start_vaddr=1001 | 40 |

Second mapping relationship

|  |  |
|---|---|
|  | Start_vaddr=1001, Start virtual address |
|  | Total_len=100 |
|  | 0021 |
|  | 20 |
| 10001 | Next1 |
|  | 0061 |
|  | 40 |
| 10002 | Next2 |
|  | 0121 |
|  | 40 |
|  | Next3=null |

DATA ACCESS METHOD AND DATA ACCESS DEVICE

CROSS-REFERENCE TO RELATED APPLICATION

The present application claims the priority of the Chinese patent application No. 202310735218.0 filed to the China National Intellectual Property Administration on Jun. 20, 2023 and entitled "DATA ACCESS METHOD AND APPARATUS, STORAGE MEDIUM, AND ELECTRONIC APPARATUS", which is incorporated herein in its entirety by reference.

TECHNICAL FIELD

Embodiments of the present application relate to the field of computers, and in particular, to method and device for direct access of remote memory.

BACKGROUND

In recent years, with the popularity of big data analysis and artificial intelligence, data has experienced an explosive growth. Emerging workloads are data-centric, and application programs require ever-larger memories. A processor and a memory are often bound together and cannot be shared. When the demand of application software for a memory of a device exceeds the available physical memory, the memory investment can be increased or the memory can be extended through virtual memory swapping.

Using virtual memory swapping to extend the memory results in performance loss due to tremendous disk overhead. A solution that uses a remote memory as a swap area, such as remote direct memory access (RDMA) technology, may be adopted. Since this part of memory data is swapped out and placed on a remote device, this method does not actually increase the memory space of a physical machine although it has a certain improvement on performance. This is in essence a central processing unit (CPU)-bypass network communication. The remote memory does not support that the CPU performs direct addressing access and operations on the memory of the remote device. Processing data of the remote memory requires the data to be read locally first and then processed. The memory of the device is not actually extended.

For the technical problem that a first device cannot access a memory space in a memory of a second device that is allowed to be accessed by the first device in the related art, no effective solution has been proposed yet.

SUMMARY

Embodiments of the present application provide method and device for direct access of remote memory.

According to one embodiment of the present application, method for direct access of remote memory is provided, including: a first start physical address to be accessed by a processor in a first device and a length of a physical address to be accessed are obtained, the first start physical address being a physical address determined according to a predetermined third mapping relationship and a first start virtual address to be accessed by the processor in the first device, and the third mapping relationship being at least a mapping relationship between a start virtual address allowed to be accessed by the first device and a start physical address allowed to be accessed by the first device; a second start virtual address corresponding to a target memory space is determined according to a predetermined first mapping relationship and the first start physical address, the first mapping relationship being at least a mapping relationship between a start physical address allowed to be accessed by the first device, a length of a physical address allowed to be accessed by the first device, and a second start virtual address corresponding to the target memory space, and the target memory device being a memory space in a memory of a second device and a memory space allowed to be accessed by the first device; and a data access request is sent to the second device, the data access request being configured to request access to the target memory space in the memory of the second device, the data access request includes the second start virtual address, the length of the physical address to be accessed, and access instruction information, the access instruction information is configured to indicate that a read operation or a write operation is performed on a memory space to be accessed in the target memory space, the memory space to be accessed being a memory space in the target memory space that is determined according to a predetermined second mapping relationship, the second start virtual address, and the length of the physical address to be accessed, and the second mapping relationship being at least a mapping relationship between a second start virtual address, a start physical address of the target memory space, and a length of a physical address of the target memory space.

In one example embodiment, a data access request is sent to the second device, including: in response to the first start physical address being a start physical address to be read by the processor and a first data set corresponding to the first start physical address and the length of the physical address to be accessed not being cached in a cache space of the first device, the data access request is sent to the second device. The first data set includes data obtained by performing the read operation on the memory space to be accessed in advance.

In one example embodiment, after a data access request is sent to the second device, the method for direct access of remote memory further includes: in response to the access instruction information indicating the read operation, M data packets sent by the second device are received, the M data packets being data packets obtained by splitting read data according to a transmission protocol between the first device and the second device, the read data being data obtained by the second device performing the read operation on the memory space to be accessed, and M being a positive integer greater than or equal to 1; the M data packets are packed to obtain the first data set; and the first start physical address, the length of the physical address to be accessed, and the first data set are cached into the cache space of the first device.

In one example embodiment, a data access request is sent to the second device, including: in response to the first start physical address being a start physical address to be written by the processor and a first data set corresponding to the first start physical address and the length of the physical address to be accessed being cached in a cache space of the first device, the first data set cached in the cache space of the first device is modified to a second data set to be written by the processor, and the data access request is sent to the second device. The first data set includes data obtained by performing the read operation on the memory space to be accessed; or in response to the first start physical address being the start physical address to be written by the processor and the first data set corresponding to the first start physical address and the length of the physical address to be accessed not being cached in the cache space of the first device, the first data set is obtained from the second device and cached into the cache space of the first device, the first data set cached in the cache space of the first device is modified to the second data set to be written by the processor, and the data access request is sent to the second device.

In one example embodiment, the data access request is sent to the second device, including: in response to the cache space being full, the data access request is sent to the second device. The data access request is configured to request to perform the write operation on the target memory space; or in response to the first data set cached in the cache space of the first device being successfully modified to the second data set to be written by the processor, the data access request is sent to the second device.

In one example embodiment, the method for direct access of remote memory further includes: in response to the first data set cached in the cache space of the first device being modified to the second data set to be written by the processor, a modification tag is set for the second data set in the cache space; and in response to the cache space being full, or in response to the cache space being full and data to be cached into the cache space existing, at least part of data without the modification tag is deleted from the cache space.

In one example embodiment, before a data access request is sent to the second device, the method for direct access of remote memory further includes: a memory extension request is initiated to the second device. The memory extension request includes the second start virtual address and the length of the physical address allowed to be accessed by the first device; and in response to the second device successfully allocating the target memory space for the first device in response to the memory extension request, the first mapping relationship is established on the first device. The target memory space is a memory space in an idle state in the memory of the second device, and the length of the physical address of the target memory space is equal to the length of the physical address allowed to be accessed by the first device.

In one example embodiment, a data access request is sent to the second device, including: an address interval between the first start physical address and the start physical address allowed to be accessed by the first device in the first mapping relationship is determined as a physical address offset, and the physical address offset is carried in the data access request, and the data access request is sent to the second device; or the first start physical address is carried in the data access request, and the data access request is sent to the second device.

In one example embodiment, a data access request is sent to the second device, including: in response to P mapping relationships being predetermined and being in one-to-one correspondence with preestablished P communication tasks, the data access request are sent to the second device through a communication task of the P communication tasks that corresponds to the first mapping relationship. P is a positive integer greater than or equal to 2, and the P mapping relationships include the first mapping relationship.

According to another embodiment of the present application, a device for direct access of remote memory is provided, including a first processor, a main memory manager, a remote memory controller, and a first communication unit. The first processor is connected to the main memory manager that is connected to the remote memory controller, and the remote memory controller is connected to the first communication unit. The main memory manager is configured to determine, according to a predetermined third mapping relationship and a first start virtual address to be accessed by the first processor, a first start physical address to be accessed by the first processor. The third mapping relationship is at least a mapping relationship between a start virtual address allowed to be accessed by the device for direct access of remote memory and a start physical address allowed to be accessed by the device for direct access of remote memory; the remote memory controller is configured to determine, according to a predetermined first mapping relationship and the first start physical address, a second start virtual address corresponding to a target memory space. The first mapping relationship is at least a mapping relationship between a start physical address allowed to be accessed by the device for direct access of remote memory, a length of a physical address allowed to be accessed by the device for direct access of remote memory, and a second start virtual address corresponding to the target memory space; and the target memory device is a memory space in a memory of a second device and a memory space allowed to be accessed by the device for direct access of remote memory; and the first communication unit is configured to send a data access request to the second device. The data access request is configured to request access to the target memory space in the memory of the second device and includes the second start virtual address corresponding to the target memory space, a length of a physical address to be accessed, and access instruction information.

According to one embodiment of the present application, another method for direct access of remote memory is further provided, including: a data access request sent by a first device is obtained. The data access request is configured to request access to a target memory space in a memory of a second device, and the target memory space is a memory space allowed to be accessed by the first device; in response to the data access request including a second start virtual address corresponding to the target memory space, a length of a physical address to be accessed, and access instruction information, a memory space to be accessed in the target memory space is determined according to a predetermined second mapping relationship, the second start virtual address, and the length of the physical address to be accessed. The second start virtual address is a virtual address determined according to a predetermined first mapping relationship and a first start physical address to be accessed by a processor in the first device, the first mapping relationship is at least a mapping relationship between a start physical address allowed to be accessed by the first device, a length of a physical address allowed to be accessed by the first device, and a second start virtual address corresponding to the target memory space, the second mapping relationship is at least a mapping relationship between a second start virtual address, a start physical address of the target memory space, and a length of a physical address of the target memory space, the first start physical address is a physical address determined according to a predetermined third mapping relationship and a first start virtual address to be accessed by the processor in the first device, and the third mapping relationship is at least a mapping relationship between a start virtual address allowed to be accessed by the first device and a start physical address allowed to be accessed by the first device; and an access operation indicated by the access instruction information is performed on the memory space to be accessed.

In one example embodiment, a memory space to be accessed in the target memory space is determined according to a predetermined second mapping relationship, the second start virtual address, and the length of the physical address to be accessed, including: in response to the data access request further including the first start physical address, an address interval between the first start physical address and the start physical address allowed to be accessed by the first device in the first mapping relationship is determined as a physical address offset; a start physical address of the memory space to be accessed in the target memory space is determined according to the second start virtual address, the second mapping relationship, and the physical address offset; and the memory space to be accessed in the target memory space is determined according to the second mapping relationship, the start physical address of the memory space to be accessed, and the length of the physical address to be accessed.

In one example embodiment, a memory space to be accessed in the target memory space is determined according to a predetermined second mapping relationship, the second start virtual address, and the length of the physical address to be accessed, including: in response to the data access request further including a physical address offset, a start physical address of the memory space to be accessed in the target memory space is determined according to the second start virtual address, the second mapping relationship, and the physical address offset. The physical address offset is an address interval between the first start physical address and the start physical address allowed to be accessed by the first device in the first mapping relationship; and the memory space to be accessed in the target memory space is determined according to the second mapping relationship, the start physical address of the memory space to be accessed, and the length of the physical address to be accessed.

In one example embodiment, a start physical address of the memory space to be accessed in the target memory space is determined according to the second start virtual address, the second mapping relationship, and the physical address offset, including: in response to the target memory space including N discontinuous memory spaces, a start physical address of a first memory space of the N memory spaces that has a mapping relationship with the second start virtual address is determined according to the second mapping relationship. N is a positive integer greater than or equal to 2, i is a positive integer greater than or equal to 1 and less than or equal to N, the second mapping relationship is a mapping relationship represented by an array linked list, a head of the array linked list includes the second start virtual address, and an i-th linked list unit in the array linked list includes a start physical address of an i-th memory space of the N memory spaces, a length of a physical address of the i-th memory space, and a start physical address of next memory space to the i-th memory space; and the start physical address of the memory space to be accessed in the target memory space is determined according to the start physical address of the first memory space and the physical address offset. An address interval between the start physical address of the first memory space and the start physical address of the memory space to be accessed is equal to the physical address offset, and an address interval between an end physical address of a previous memory space and a start physical address of a latter memory space of the N memory spaces is regarded as 1.

In one example embodiment, the memory space to be accessed in the target memory space is determined according to the second mapping relationship, the start physical address of the memory space to be accessed, and the length of the physical address to be accessed, including: an end physical address of the memory space to be accessed in the target memory space is determined according to the second mapping relationship, the start physical address of the memory space to be accessed, and the length of the physical address to be accessed. An address interval between the start physical address of the memory space to be accessed and the end physical address of the memory space to be accessed is equal to the length of the physical address to be accessed; and in the target memory space, a corresponding memory space from the start physical address of the memory space to be accessed to the end physical address of the memory space to be accessed is determined as the memory space to be accessed.

In one example embodiment, a start physical address of the memory space to be accessed in the target memory space is determined according to the second start virtual address, the second mapping relationship, and the physical address offset, including: in response to the target memory space including one memory space, a start physical address of the one memory space of the target memory space that has a mapping relationship with the second start virtual address is determined according to the second mapping relationship. The second mapping relationship is at least a mapping relationship between a second start virtual address, a start physical address of the one memory space, and a length of a physical address of the one memory space; and the start physical address of the memory space to be accessed in the target memory space is determined according to the start physical address of the one memory space and the physical address offset. An address interval between the start physical address of the one memory space and the start physical address of the memory space to be accessed is equal to the physical address offset.

In one example embodiment, an access operation indicated by the access instruction information is performed on the memory space to be accessed, including: in response to the access instruction information indicating a read operation, the read operation is performed on the memory space to be accessed to obtain read data; the read data is split into M data packets according to a transmission protocol between the first device and the second device. M is a positive integer greater than or equal to 1; and the M data packets are sent to the first device.

In one example embodiment, an access operation indicated by the access instruction information is performed on the memory space to be accessed, including: in response to the access instruction information indicating a write operation and the data access request further including data to be written, the data to be written is written to the memory space to be accessed; or in response to the access instruction information indicating the write operation and the data access request including no data to be written, indication information is sent to the first device. The indication information is configured to represent that the second device is ready for performing the write operation; M data packets sent by the first device are obtained. The M data packets are data packets obtained by splitting the data to be written according to a transmission protocol between the first device and the second device, and M is a positive integer greater than or equal to 1; the M data packets are packed to obtain the data to be written; and the data to be written are written to the memory space to be accessed.

In one example embodiment, before a data access request sent by a first device is obtained, the method for direct access of remote memory further includes: the target memory space in an idle state is determined in the memory of the second device in response to a memory extension request sent by the first device. The memory extension request includes the second start virtual address and the length of the physical address allowed to be accessed by the first device, and the length of the physical address of the target memory space is equal to the length of the physical address allowed to be accessed by the first device; and a mapping relationship between a second start virtual address, a start physical address of the target memory space, and a length of a physical address of the target memory space is established to obtain the second mapping relationship.

In one example embodiment, a mapping relationship between a second start virtual address, a start physical address of the target memory space, and a length of a physical address of the target memory space is established to obtain the second mapping relationship, including: in response to the target memory space including N discontinuous memory spaces, an array linked list for representing the second mapping relationship is established. N is a positive integer greater than or equal to 2, i is a positive integer greater than or equal to 1 and less than or equal to N, a head of the array linked list includes the second start virtual address, and an i-th linked list unit in the array linked list includes a start physical address of an i-th memory space of the N memory spaces, a length of a physical address of the i-th memory space, and a start physical address of next memory space to the i-th memory space.

According to another embodiment of the present application, a remote data storage device is further provided, including a second communication unit and a memory. The second communication unit includes a media access control unit, a communication control unit, and a direct memory access unit; the media access control unit is configured to obtain a data access request sent by a first device. The data access request is configured to request access to a target memory space in the memory, and the target memory space is a memory space allowed to be accessed by the first device; the communication control unit is configured to: in response to the data access request including a second start virtual address corresponding to the target memory space, a length of a physical address to be accessed, and access instruction information, determine, according to a predetermined second mapping relationship, the second start virtual address, and the length of the physical address to be accessed, a memory space to be accessed in the target memory space. The second start virtual address is a virtual address determined according to a predetermined first mapping relationship and a first start physical address to be accessed by a processor in the first device; the first mapping relationship is at least a mapping relationship between a start physical address allowed to be accessed by the first device, a length of a physical address allowed to be accessed by the first device, and a second start virtual address corresponding to the target memory space; the second mapping relationship is at least a mapping relationship between a second start virtual address, a start physical address of the target memory space, and a length of a physical address of the target memory space; the first start physical address is a physical address determined according to a predetermined third mapping relationship and a first start virtual address; and the third mapping relationship is at least a mapping relationship between a start virtual address allowed to be accessed by the first device and a start physical address allowed to be accessed by the first device; and the direct memory access unit is configured to perform an access operation indicated by the access instruction information on the memory space to be accessed.

According to still another embodiment of the present application, a non-volatile readable storage medium is further provided, storing a computer program which is configured to, in response to running, perform the steps in any method embodiment described above.

According to still another embodiment of the present application, an electronic apparatus is further provided, including a memory and a processor. A computer program is stored in the memory, and the processor is configured to run the computer program to perform the steps in any method embodiment described above.

According to the embodiments of the present application, the memory space allowed to be accessed by the first device is allocated for the first device from the idle memory space in the memory of the second device. The first mapping relationship and the second mapping relationship are predetermined. If the second device obtains the data access request sent by the first device, the memory space to be accessed in the memory space allowed to be accessed by the first device in the memory of the second device can be determined according to the predetermined second mapping relationship, the second start virtual address, and the length of the physical address to be accessed, and then the process of the access operation indicated by the access instruction information can be performed on the memory space to be accessed . . .

DETAILED DESCRIPTION OF THE EMBODIMENTS

Embodiments of the present application will be described in detail with reference to the drawings and in combination with the examples hereinafter.

It should be noted that the terms "first", "second", and the like in the description of the embodiments, the claims, and the drawings of the present application and the drawings above are used to distinguish between similar objects, and are not necessarily used to describe a specific sequence or sequential order.

For a better understanding of a method for direct access of remote memory in the embodiments of the present application, an application scenario of the method for direct access of remote memory in the embodiments of the present application are explained and described below, which may be applicable to, without limitation, the embodiments of the present application.

Figure 1:
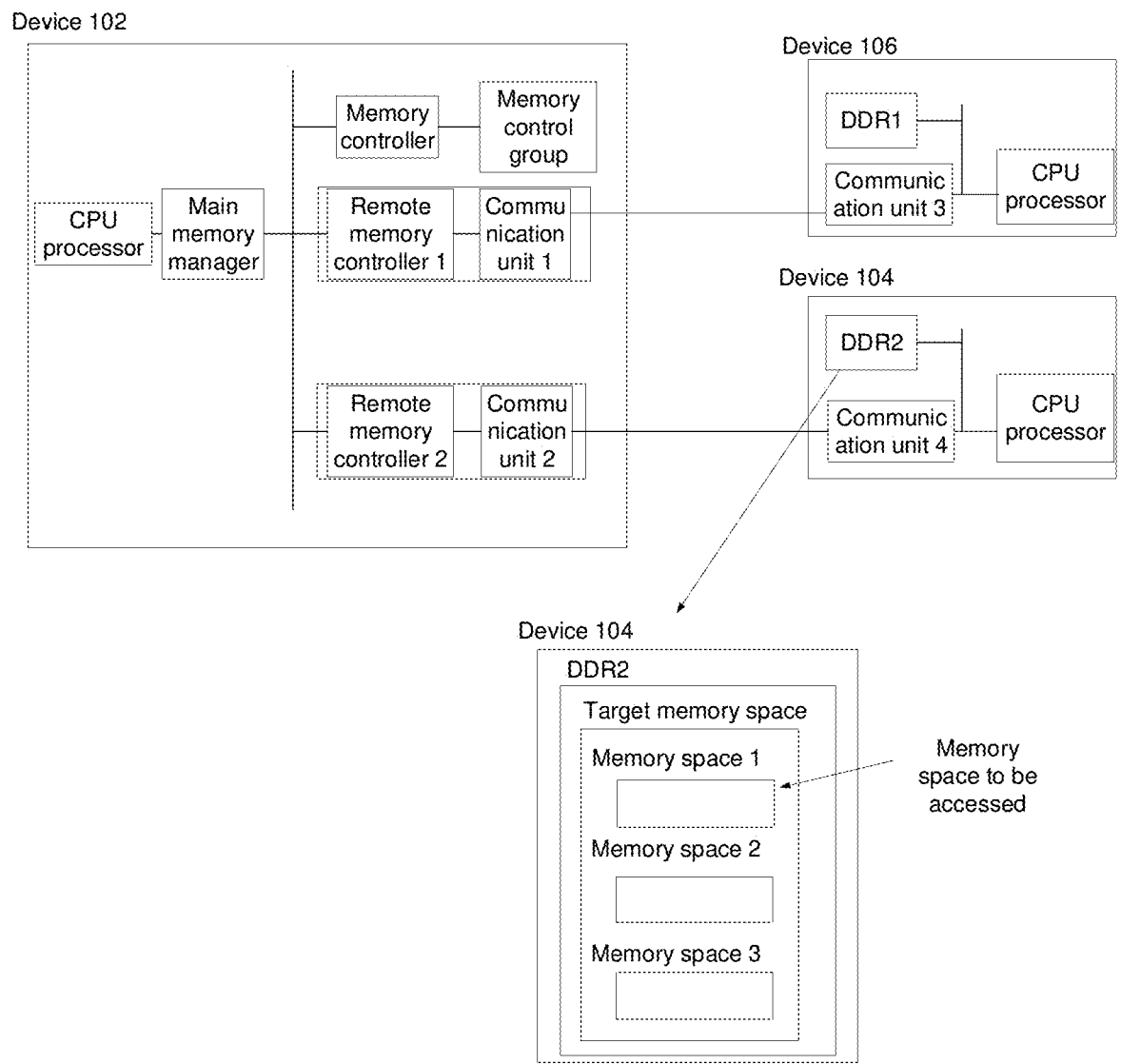
FIG. 1 is a schematic diagram of an application scenario of a method for direct access of remote memory according to an embodiment of the present application.

FIG. 1 is a schematic diagram of an application scenario of a method for direct access of remote memory according to an embodiment of the present application. As shown in FIG. 1, In one embodiment of this application, in this embodiment, a device 102, a device 104, and a device 106 can be, but not limited to, terminals, servers, computer terminals, or the like. In this embodiment, the following explanation and description may be made by taking, without limitation, the device 102, the device 104, and the device 106 being servers as an example. In a case where an application program of the device 102 has an increasing demand for a memory of the device 102, the memory of device 102 may not be enough, while a memory (e.g., Double Data Rate (DDR) 1) of the device 106 has an idle memory space, and a memory (e.g., DDR2) of the device 104 has an idle memory space. In such a case, at least part of the idle memory spaces in the memory of the device 106 and at least part of the idle memory spaces in the memory of the device 104 may be allocated to the device 102 so that the device 102 can access at least part of the idle memory spaces in the memory of the device 106 and at least part of the idle memory spaces in the memory of the device 104, thereby realizing the extension of the memory of the device 102.

In detail, a CPU processor, a main memory manager, a memory manager and a memory bank control group, a plurality of remote memory controllers (such as a remote memory controller 1 and a remote memory controller 2), and communication units (such as a communication unit 1 and a communication unit 2) are deployed on the device 102. The CPU processor is connected to the main memory manager which is connected to a plurality of memory controllers and the remote memory controllers (such as the remote memory controller 1 and the remote memory controller 2). The memory controllers are connected to the memory control group, and the remote memory controllers are connected to the communication units (e.g., the remote memory controller 1 is connected to the communication unit 1, and the remote memory controller 2 is connected to the communication unit 2). In one embodiment of this application, in this embodiment, the CPU processor may include, but is not limited to, a processing apparatus such as a microprocessor unit (MCU) or a field programmable gate array (FPGA).

A communication unit 3, DDR1, and a CPU processor are deployed on the device 106, and a communication unit 4, DDR1, and a CPU processor are deployed on the device 104. The communication unit 3 is connected to the communication unit 1, and the communication unit 4 is connected to the communication unit 2. It can be taken as an example, without limitation, that a memory space allowed to be accessed by the device 102 is allocated for the device 102 from the idle memory space of the memory (e.g., DDR2) of the device 104. A target memory space allowed to be accessed by the device 102 is allocated for the device 102 from the idle memory space of the memory of the device 104. The target memory space may include, but is not limited to, a memory space 1, a memory space 2, and a memory space 3. Access to the memory space 1 (equivalent to the memory space to be accessed) can be achieved by, without limitation, the following steps.

At step S101, a first start physical address to be accessed by a processor in the device 102 and a length of a physical address to be accessed are obtained. The first start physical address is a physical address determined according to a predetermined third mapping relationship and a first start virtual address to be accessed by the processor in the first device, and the third mapping relationship is at least a mapping relationship between a start virtual address allowed to be accessed by the first device and a start physical address allowed to be accessed by the first device.

At step S102, a second start virtual address corresponding to a target memory space is determined according to a predetermined first mapping relationship and the first start physical address. The first mapping relationship is at least a mapping relationship between a start physical address allowed to be accessed by the first device, a length of a physical address allowed to be accessed by the first device, and a second start virtual address corresponding to the target memory space; and the target memory device is a memory space in the memory of the device 104 and a memory space allowed to be accessed by the first device.

At step S103, a data access request is sent to the device 104. The data access request is configured to request access to the target memory space in the memory of the device 104, the data access request includes the second start virtual address, the length of the physical address to be accessed, and access instruction information, the access instruction information is configured to indicate that a read operation or a write operation is performed on a memory space to be accessed in the target memory space; the memory space to be accessed is a memory space in the target memory space that is determined according to a predetermined second mapping relationship, the second start virtual address, and the length of the physical address to be accessed; and the second mapping relationship is at least a mapping relationship between a second start virtual address, a start physical address of the target memory space, and a length of a physical address of the target memory space.

Figure 2:
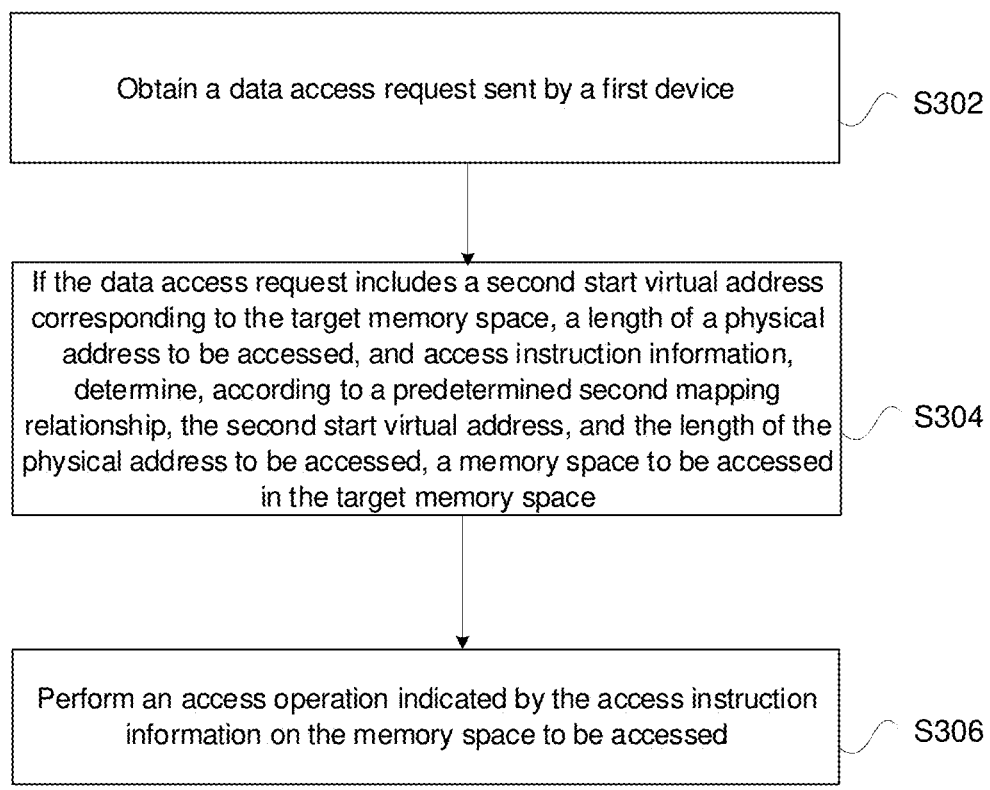
FIG. 2 is a flowchart I of a method for direct access of remote memory according to an embodiment of the present application.

A data access method run on a mobile terminal as described above is provided in this embodiment. FIG. 2 is a flowchart I of a method for direct access of remote memory according to an embodiment of the present application. As shown in FIG. 2, the flow includes the following steps.

At step S302, a data access request sent by a first device is obtained. The data access request is configured to request access to a target memory space in a memory of a second device, and the target memory space is a memory space allowed to be accessed by the first device.

At step S304, if the data access request includes a second start virtual address corresponding to the target memory space, a length of a physical address to be accessed, and access instruction information, a memory space to be accessed in the target memory space is determined according to a predetermined second mapping relationship, the second start virtual address, and the length of the physical address to be accessed. The second start virtual address is a virtual address determined according to a predetermined first mapping relationship and a first start physical address to be accessed by a processor in the first device; the first mapping relationship is at least a mapping relationship between a start physical address allowed to be accessed by the first device, a length of a physical address allowed to be accessed by the first device, and a second start virtual address corresponding to the target memory space; the second mapping relationship is at least a mapping relationship between a second start virtual address, a start physical address of the target memory space, and a length of a physical address of the target memory space; the first start physical address is a physical address determined according to a predetermined third mapping relationship and a first start virtual address to be accessed by the processor in the first device; and the third mapping relationship is at least a mapping relationship between a start virtual address allowed to be accessed by the first device and a start physical address allowed to be accessed by the first device.

At step S306, an access operation indicated by the access instruction information is performed on the memory space to be accessed.

By the steps above, the memory space allowed to be accessed by the first device is allocated for the first device from the idle memory space in the memory of the second device. The first mapping relationship and the second mapping relationship are predetermined. If the second device obtains the data access request sent by the first device, the memory space to be accessed in the memory space allowed to be accessed by the first device in the memory of the second device can be determined according to the predetermined second mapping relationship, the second start virtual address, and the length of the physical address to be accessed, and then the process of the access operation indicated by the access instruction information can be performed on the memory space to be accessed. In such a way, direct addressing and access to the extended memory of the first device on the second device are realized. Therefore, the problem that the first device cannot access the memory space in the memory of the second device that is allowed to be accessed by the first device is solved, thereby achieving the effect that the first device may access the memory space in the memory of the second device that is allowed to be accessed by the first device.

The execution subject of the steps above may be, but not limited to, a terminal, a server, etc.

In the technical solution provided by the step S302 above, the first device and the second device may include, but are not limited to, servers, terminal devices, etc. The memory of the first device is limited and might be unable to meet the requirements of application programs on the first device. It will be understood that the memory of the first device might be not enough, and in such a case, if there are idle memory spaces in the memories of one or more second devices, without limitation, at least part of the idle memory spaces in the memories of the one or more second devices may be allocated to the first device so that the first device may access these remote memory spaces, thereby realizing the extension of the memory of the first device and increasing the usage ratio of the idle memory spaces on the second devices.

In one embodiment of this application, in this embodiment, the target memory space may be, but not limited to, a memory space allowed to be accessed by the first device such as at least part of memory spaces in the memory of the second device. It will be understood that the first device is allowed to access, e.g., read or write, the target memory space.

In one embodiment of this application, in this embodiment, if the second device obtains the data access request, it may indicate a case where the first device wishes to access the target memory space in the second device, e.g., data that the first device wishes to access is stored in the target memory space in the memory of the second device, etc.

In one example embodiment, the second mapping relationship may be established in, without limitation, the following way: the target memory space in an idle state is determined in the memory of the second device in response to a memory extension request sent by the first device. The memory extension request includes the second start virtual address and the length of the physical address allowed to be accessed by the first device; and the length of the physical address of the target memory space is equal to the length of the physical address allowed to be accessed by the first device; and a mapping relationship between a second start virtual address, a start physical address of the target memory space, and a length of a physical address of the target memory space is established to obtain the second mapping relationship.

In one embodiment of this application, in this embodiment, if the memory of the first device is not enough, the second device can determine the target memory space in the idle state in the memory of the second device by, but not limited to, responding to the memory extension request initiated by the first device. The target memory space may be, but not limited to, at least part of the idle memory spaces in the memory of the second device. It will be understood that the memory space in the idle state in the memory of the second device may be, but not limited to, the target memory space, or the memory space in the idle state in the memory of the second device may also be a memory space allowed to be accessed by other devices than the first device. That is, at least part of the memory spaces in the idle state in the memory of the second device may be used as the extended memory space for other devices than the first device.

In detail, if the memory of the first device is not enough, a user mode program is created by the second device, and after applying for allocation of the memory space in the idle state in the memory of the second device, a mapping relationship between a second start virtual address, a start physical address of the target memory space, and a length of a physical address of the target memory space is established and is stored in a kernel, and a communication unit is initialized and then access by a remote memory demander over a network is waited for.

In one example embodiment, the second mapping relationship may be established in, without limitation, the following way: if the target memory space includes N discontinuous memory spaces, an array linked list for representing the second mapping relationship is established. N is a positive integer greater than or equal to 2; i is a positive integer greater than or equal to 1 and less than or equal to N; a head of the array linked list includes the second start virtual address; and an i-th linked list unit in the array linked list includes a start physical address of an i-th memory space of the N memory spaces, a length of a physical address of the i-th memory space, and a start physical address of next memory space to the i-th memory space.

In one embodiment of this application, in this embodiment, the N discontinuous memory spaces may be construed as the physical addresses of the N memory spaces being discontinuous and the physical address in each of the N memory spaces being continuous.

For a better understanding of the second mapping relationship in the embodiments of the present application, the second mapping relationship in the embodiments of the present application are explained and described below in conjunction with an embodiment, which may be applicable to, without limitation, the embodiments of the present application.

Figure 3:
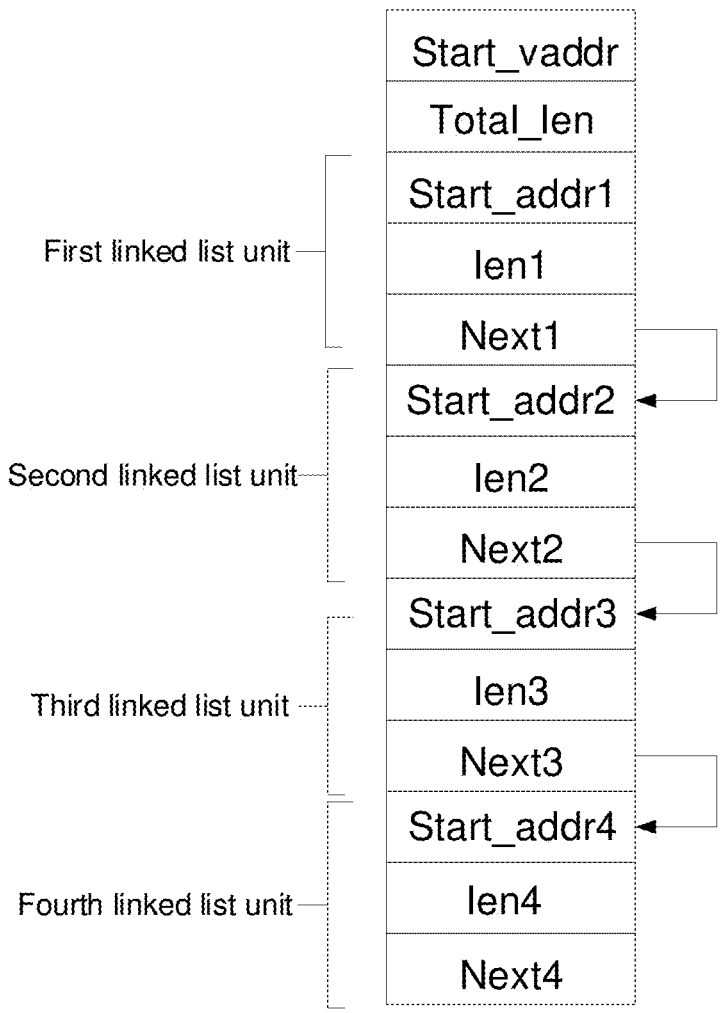
FIG. 3 is a schematic diagram I of a second mapping relationship according to an embodiment of the present application.

FIG. 3 is a schematic diagram I of a second mapping relationship according to an embodiment of the present application. As shown in FIG. 3, if the target memory space includes 4 discontinuous memory spaces, an array linked list is configured to represent the second mapping relationship. A head of the array linked list includes a second start virtual address (Start_vaddr). The array linked list may further include a total length (Total_len) of physical addresses.

A first linked list unit in the array linked list includes a start physical address (Start_addr1) of a first memory space of the 4 memory spaces, a length (len1) of a physical address of the first memory space, and a start physical address (Next1) of next memory space to the first memory space. In one embodiment of this application, Next1 corresponds to an address of the start physical address Start_addr2 of next memory space in a storage space where physical addresses of memory spaces are stored. A second linked list unit includes a start physical address (Start_addr2) of a second memory space of the 4 memory spaces, a length (len2) of a physical address of the second memory space, and a start physical address (Next2) of next memory space to the second memory space. In one embodiment of this application, Next2 corresponds to an address of the start physical address Start_addr3 of next memory space in the storage space where the physical addresses of the memory spaces are stored. A third linked list unit includes a start physical address (Start_addr3) of a third memory space of the 4 memory spaces, a length (len3) of a physical address of the third memory space, and a start physical address (Next3) of next memory space to the third memory space. In one embodiment of this application, Next3 corresponds to an address of the start physical address Start_addr4 of next memory space in the storage space where physical addresses of memory spaces are stored. A fourth linked list unit includes a start physical address (Start_addr4) of a fourth memory space of the 4 memory spaces, a length (len4) of a physical address of the fourth memory space, and a start physical address (Next4) of next memory space to the fourth memory space. In one embodiment of this application, Next4=null.

In the technical solution provided by the step S304 above, the first mapping relationship is at least a mapping relationship between a start physical address allowed to be accessed by the first device, a length of a physical address allowed to be accessed by the first device, and a start virtual address corresponding to the target memory space. It will be understood that if the first device is allowed to access the memory spaces of a plurality of devices, the first mapping relationship may also be at least a mapping relationship between a start physical address allowed to be accessed by the first device, a length of a physical address allowed to be accessed by the first device, a device allowed to be accessed by the first device, and a start virtual address corresponding to the target memory space, etc.

In one embodiment of this application, in this embodiment, the target memory space is an extended memory space preconfigured for the first device.

For a better understanding of the process of determining the memory space to be accessed in the target memory space in the embodiments of the present application, the process of determining the memory space to be accessed in the target memory space in the embodiments of the present application is explained and described below in conjunction with an embodiment, which may be applicable to, without limitation, the embodiments of the present application.

Figures 4, 5:
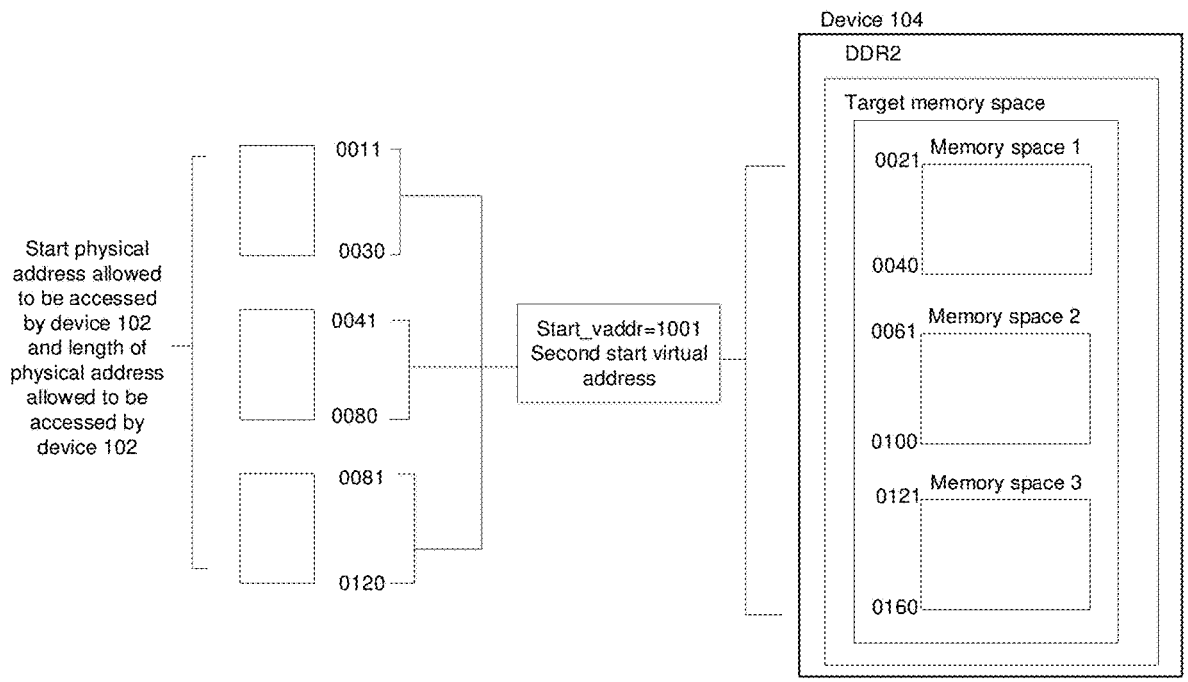
FIG. 4 is a schematic diagram I of determining a memory space to be accessed according to an embodiment of the present application.
FIG. 5 is a schematic diagram of a first mapping relationship according to an embodiment of the present application.

FIG. 4 is a schematic diagram I of determining a memory space to be accessed according to an embodiment of the present application. As shown in FIG. 4, start physical addresses allowed to be accessed by a device 102 and lengths of physical addresses allowed to be accessed by the device 102 are respectively as follows: 0011, and the length of the physical address: 20; 0041, and the length of the physical address: 40; and 0081, and the length of the physical address: 40. A second start virtual address may be determined according to, without limitation, a predetermined first mapping relationship and a first start physical address to be accessed by a processor in the device 102. For example, if the first start physical address to be accessed by the processor in the device 102 is within the three physical address ranges above, the second start virtual address is determined as Start_vaddr=1001. In a target memory space in a memory (e.g., DDR2) of a device 104, the second start virtual address is Start_vaddr=1001, and the corresponding memory spaces include a memory space 1, a memory space 2, and a memory space 3. The start physical address of the memory space 1 is 0021, and the length of the physical address of the memory space 1 is 20. The start physical address of the memory space 2 is 0061, and the length of the physical address of the memory space 2 is 40. The start physical address of the memory space 3 is 0121, and the length of the physical address of the memory space 3 is 0160. The memory space to be accessed in the target memory space may be determined according to, without limitation, a predetermined second mapping relationship, the second start virtual address (Start_vaddr=1001), and a length of a physical address to be accessed. For example, the memory space to be accessed is the memory space 3.

FIG. 5 is a schematic diagram of a first mapping relationship according to an embodiment of the present application. With reference to FIG. 4 and FIG. 5, the first mapping relationship records at least a mapping relationship between a start physical address allowed to be accessed by the device 102, a length of the physical address allowed to be accessed by the device 102, Host_ip and port of the device 104 where the memory space 1 is located, and the second start virtual address (e.g., Start_vaddr=1001) corresponding to the memory space 1.

In detail, the first mapping relationship records: a mapping relationship between a start physical address (Start_addr=0011) allowed to be accessed by the device 102, a length (20) of a physical address allowed to be accessed by the device 102, Host_ip1 and port1 of the device 104 where the memory space 1 is located, a second start virtual address (Start_vaddr=1001) corresponding to the memory space 1, and a length (20) of a physical address of the memory space 1; and a mapping relationship between a start physical address (Start_addr=0041) allowed to be accessed by the device 102, a length (40) of a physical address allowed to be accessed by the device 102, Host_ip1 and port1 of the device 104 where the memory space 2 is located, a second start virtual address (Start_vaddr=1001) corresponding to the memory space 2, and a length (40) of a physical address of the memory space 2; and a mapping relationship between a start physical address (Start_addr=0081) allowed to be accessed by the device 102, a length (40) of a physical address allowed to be accessed by the device 102, Host_ip1 and port1 of the device 104 where the memory space 3 is located, a second start virtual address (Start_vaddr=1001) corresponding to the memory space 3, and a length (40) of a physical address of the memory space 3.

Figures 6, 7:
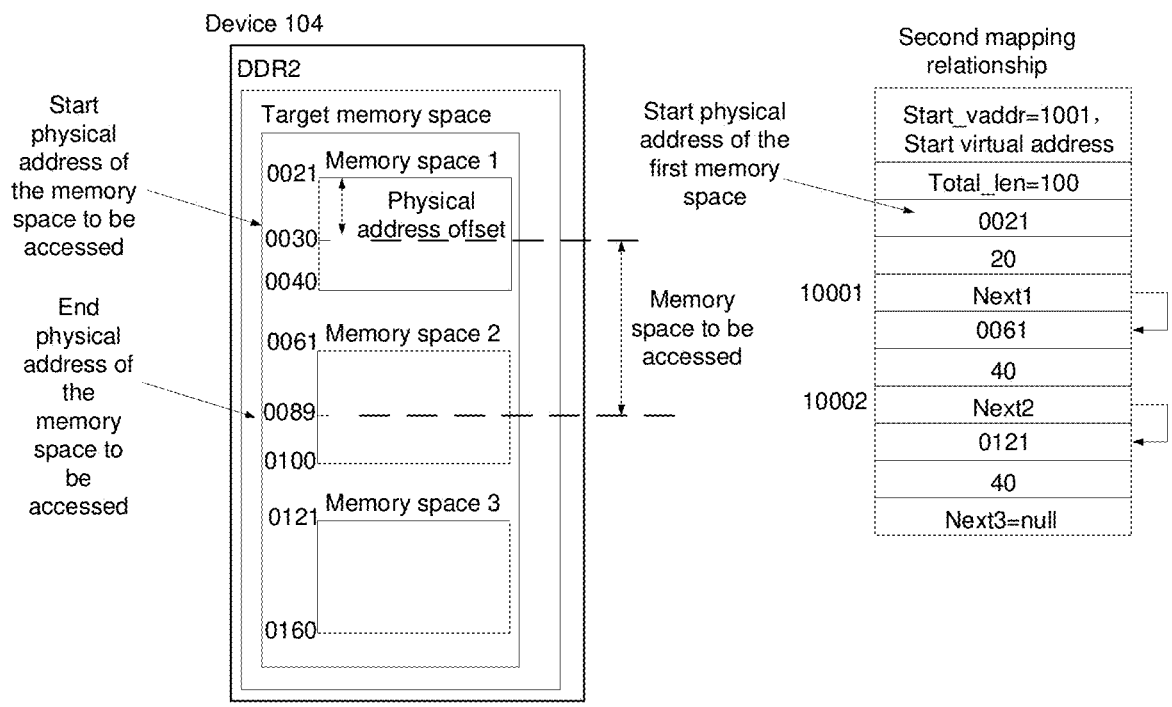
FIG. 6 is a schematic diagram II of a second mapping relationship according to an embodiment of the present application.
FIG. 7 is a schematic diagram II of determining a memory space to be accessed according to an embodiment of the present application.

FIG. 6 is a schematic diagram II of a second mapping relationship according to an embodiment of the present application. With reference to FIG. 4 and FIG. 6, the second mapping relationship is at least a mapping relationship between a second start physical address, a start physical address of the target memory space, and a length of a physical address of the target memory space. The second mapping relationship may be identified by, without limitation, an array linked list. A head of the array linked list includes the second start physical address (Start_vaddr). The array linked list may further include a total length (Total_len) of physical addresses.

In detail, a first linked list unit in the array linked list includes a start physical address (0021) of a first memory space of 3 memory spaces, a length (20) of a physical address of the first memory space, and a start physical address (Next1) of next memory space to the first memory space. In one embodiment of this application, Next1 corresponds to an address of the start physical address of next memory space in a storage space where physical addresses of memory spaces are stored. For example, Next1 corresponds to the address (10001) of the start physical address (0061) of next memory space in the storage space where the physical addresses of the memory spaces are stored. A second linked list includes a start physical address (0061) of a second memory space of the 3 memory spaces, a length (40) of a physical address of the second memory space, and a start physical address (Next2) of next memory space to the second memory space. In one embodiment of this application, Next2 corresponds to an address of the start physical address of next memory space in the storage space where the physical addresses of the memory spaces are stored. For example, Next2 corresponds to the address (10002) of the start physical address (0121) of next memory space in the storage space where the physical addresses of the memory spaces are stored. A third linked list unit includes a start physical address (0121) of a third memory space of the 3 memory spaces, a length (40) of a physical address of the third memory space, and a start physical address (Next3) of next memory space to the third memory space. In one embodiment of this application, Next3=null.

In one example embodiment, the memory space to be accessed in the target memory space may be determined in, without limitation, the following way: if the data access request further includes the first start physical address, an address interval between the first start physical address and the start physical address allowed to be accessed by the first device in the first mapping relationship is determined as a physical address offset; a start physical address of the memory space to be accessed is determined in the target memory space according to the second start virtual address, the second mapping relationship, and the physical address offset; and the memory space to be accessed in the target memory space is determined according to the second mapping relationship, the start physical address of the memory space to be accessed, and the length of the physical address to be accessed.

In one embodiment of this application, in this embodiment, if the data access request further includes the first start physical address, without limitation, the address interval between the first start physical address and the start physical address allowed to be accessed by the first device in the first mapping relationship can be determined as the physical address offset. It will be understood that the first start physical address can be, but not limited to, any physical address within a physical address range composed of the start physical address allowed to be accessed by the first device and the length of the physical address allowed to be accessed by the first device.

In one example embodiment, the memory space to be accessed in the target memory space may be determined in, without limitation, the following way: if the data access request further includes a physical address offset, a start physical address of the memory space to be accessed is determined in the target memory space according to the second start virtual address, the second mapping relationship, and the physical address offset. The physical address offset is an address interval between the first start physical address and the start physical address allowed to be accessed by the first device in the first mapping relationship; and the memory space to be accessed in the target memory space is determined according to the second mapping relationship, the start physical address of the memory space to be accessed, and the length of the physical address to be accessed.

In one embodiment of this application, in this embodiment, the data access request may also carry, without limitation, the physical address offset. In such a case, the start physical address of the memory space to be accessed can be determined in the target memory space directly according to, without limitation, the second data access request, the second mapping relationship, and the physical address offset. In such a way, the computer resources required by the second device to compute the physical address offset are saved, and the utilization ratio of the resources of the second device is increased.

In one example embodiment, the start physical address of the memory space to be accessed may be determined in, without limitation, the following way: if the target memory space includes N discontinuous memory spaces, a start physical address of a first memory space of the N memory spaces that has a mapping relationship with the second start virtual address is determined according to the second mapping relationship. N is a positive integer greater than or equal to 2; i is a positive integer greater than or equal to 1 and less than or equal to N; the second mapping relationship is a mapping relationship represented by an array linked list; a head of the array linked list includes the second start virtual address; and an i-th linked list unit in the array linked list includes a start physical address of an i-th memory space of the N memory spaces, a length of a physical address of the i-th memory space, and a start physical address of next memory space to the i-th memory space; and the start physical address of the memory space to be accessed is determined in the target memory space according to the start physical address of the first memory space and the physical address offset. An address interval between the start physical address of the first memory space and the start physical address of the memory space to be accessed is equal to the physical address offset; and an address interval between an end physical address of a previous memory space and a start physical address of a latter memory space of the N memory spaces is regarded as 1.

In one embodiment of this application, in this embodiment, the N discontinuous memory spaces may be construed as the physical addresses of the N memory spaces being discontinuous and the physical address in each of the N memory spaces being continuous, and the address interval between the end physical address of the previous memory space and the start physical address of the latter memory space of the N memory spaces is regarded as 1.

In one example embodiment, the memory space to be accessed in the target memory space may be determined in, without limitation, the following way: an end physical address of the memory space to be accessed is determined in the target memory space according to the second mapping relationship, the start physical address of the memory space to be accessed, and the length of the physical address to be accessed. An address interval between the start physical address of the memory space to be accessed and the end physical address of the memory space to be accessed is equal to the length of the physical address to be accessed; and a corresponding memory space from the start physical address of the memory space to be accessed to the end physical address of the memory space to be accessed is determined as the memory space to be accessed in the target memory space.

In one embodiment of this application, in this embodiment, the corresponding memory space from the start physical address of the memory space to be accessed to the end physical address of the memory space to be accessed can be determined, without limitation, as the memory space to be accessed in the target embodiment. It will be understood that the memory space to be accessed might be one or more complete memory spaces in the target memory space, or one or more incomplete memory spaces in the target memory space. That is to say, the memory space to be accessed includes at least one of the complete memory spaces and the incomplete memory spaces in the target memory space.

For a better understanding of the process of determining the memory space to be accessed in the embodiments of the present application, the process of determining the memory space to be accessed in the embodiments of the present application is explained and described below in conjunction with an embodiment, which may be applicable to, without limitation, the embodiments of the present application.

FIG. 7 is a schematic diagram II of determining a memory space to be accessed according to an embodiment of the present application. With reference to FIGS. 4, 5, 6, and 7, the first start physical address to be accessed by the processor in the device 102 (equivalent to the first device) is 0020; the length of the physical address to be accessed is 60; and the address interval between the first start physical address to be accessed (0020) and the start physical address (0011) allowed to be accessed by the device 102 in the first mapping relationship is determined as the physical address offset, i.e., the physical address offset is 10. The second start virtual address is determined as Start_vaddr=1001 according to the predetermined first mapping relationship and the first start physical address (0020) to be accessed by the processor in the device 102.

The start physical address of the memory space to be accessed is determined in the target memory space according to the second start virtual address (Start_vaddr=1001), the second mapping relationship, and the physical address offset (10). In detail, if the target memory space includes 3 discontinuous memory spaces (e.g., the memory space 1, the memory space 2, and the memory space 3), the start physical address (0021) of the first memory space (e.g., the memory space 1) of the 3 memory spaces that has a mapping relationship with the second start virtual address (Start_vaddr=1001) is determined according to the second mapping relationship; and the start physical address of the memory space to be accessed is determined as 0030 in the target memory space according to the start physical address (0021) of the first memory space (e.g., the memory space 1) and the physical address offset (10). The address interval between the start physical address (0021) of the first memory space (e.g., the memory space 1) and the start physical address (0030) of the memory space to be accessed is equal to the physical address offset (10).

Upon determining the start physical address (0030) of the memory space to be accessed, the end physical address (0089) of the memory space to be accessed can be determined in the target memory space according to, without limitation, the second mapping relationship, the start physical address (0030) of the memory space to be accessed, and the length (60) of the physical address to be accessed. The address interval between the start physical address of the memory space to be accessed and the end physical address of the memory space to be accessed is equal to the length (60) of the physical address to be accessed; and the corresponding memory space from the start physical address (0030) of the memory space to be accessed to the end physical address (0089) of the memory space to be accessed is determined as the memory space to be accessed in the target memory space.

In one example embodiment, the start physical address of the memory space to be accessed may also be determined in the target memory space in, without limitation, the following way: if the target memory space includes one memory space, a start physical address of the one memory space of the target memory space that has a mapping relationship with the second start virtual address is determined according to the second mapping relationship. The second mapping relationship is at least a mapping relationship between a second start virtual address, a start physical address of the one memory space, and a length of a physical address of the one memory space; and the start physical address of the memory space to be accessed is determined in the target memory space according to the start physical address of the one memory space and the physical address offset. An address interval between the start physical address of the one memory space and the start physical address of the memory space to be accessed is equal to the physical address offset.

In one embodiment of this application, in this embodiment, the memory space to be accessed in the target memory space may be determined in, without limitation, the following way: the end physical address of the memory space to be accessed is determined in the target memory space according to the second mapping relationship, the start physical address of the memory space to be accessed, and the length of the physical address to be accessed. The address interval between the start physical address of the memory space to be accessed and the end physical address of the memory space to be accessed is equal to the length of the physical address to be accessed; and the corresponding memory space from the start physical address of the memory space to be accessed to the end physical address of the memory space to be accessed is determined as the memory space to be accessed in the target memory space.

For a better understanding of the process of determining the memory space to be accessed in the embodiments of the present application, the process of determining the memory space to be accessed in the embodiments of the present application is explained and described below in conjunction with an embodiment, which may be applicable to, without limitation, the embodiments of the present application.

Figure 8:
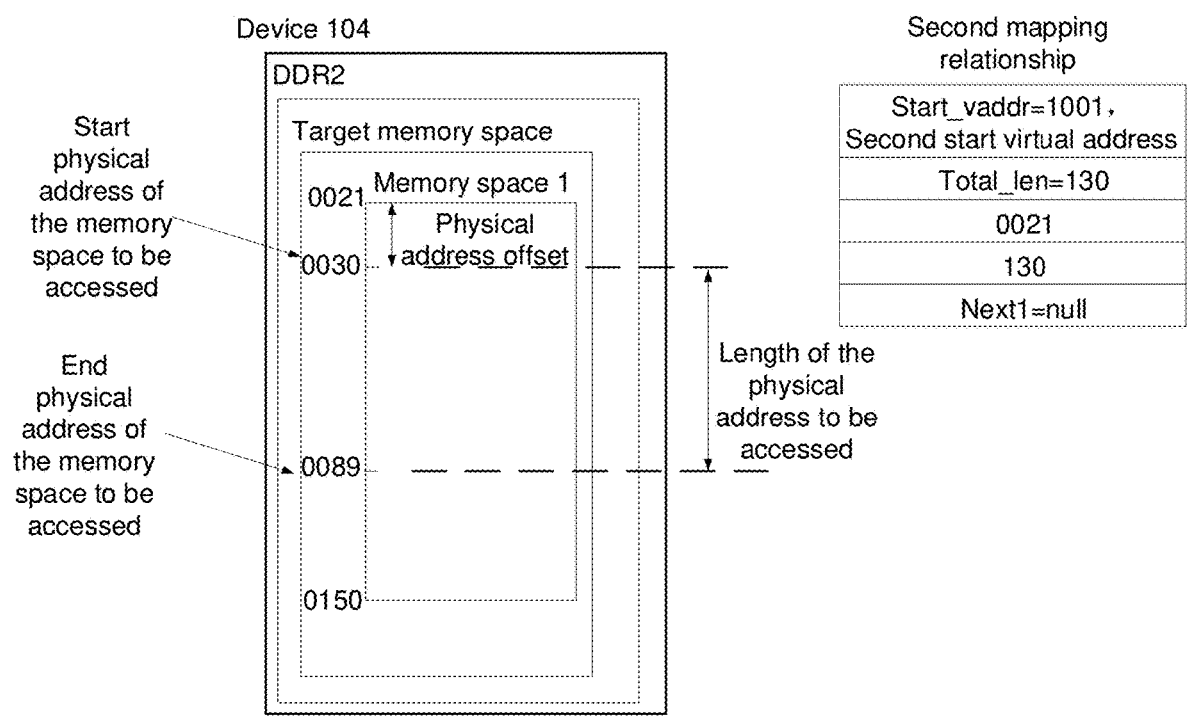
FIG. 8 is a schematic diagram III of determining a memory space to be accessed according to an embodiment of the present application.

FIG. 8 is a schematic diagram III of determining a memory space to be accessed according to an embodiment of the present application. As shown in FIG. 8, a first start physical address to be accessed by a processor in a device 102 (equivalent to a first device) is 0020, and a length of a physical address to be accessed is 60. A target memory space on a device 104 (equivalent to a second device) includes a memory space 1. A start physical address of the memory space 1 is 0021, while an end physical address is 150, and a length of a physical address is 130.

The address interval between the first start physical address to be accessed (0020) and the start physical address (0011) allowed to be accessed by the device 102 in the first mapping relationship is determined as the physical address offset, i.e., the physical address offset is 10. The second start virtual address is determined as Start_vaddr=1001 according to the predetermined first mapping relationship and the first start physical address (0020) to be accessed by the processor in the device 102.

The start physical address of the memory space to be accessed is determined in the target memory space according to the second start virtual address (Start_vaddr=1001), the second mapping relationship, and the physical address offset (10). In detail, if the target memory space includes one memory space, the start physical address (0021) of the one memory space of the target memory space that has a mapping relationship with the second start virtual address (Start_vaddr=1001) is determined according to the second mapping relationship. The start physical address (0030) of the memory space to be accessed is determined in the target memory space according to the start physical address (0021) of the one memory space and the physical address offset (10). The address interval between the start physical address (0021) of the one memory space and the start physical address (0030) of the memory space to be accessed is equal to the physical address offset (10).

The end physical address (0089) of the memory space to be accessed can be determined in the one memory space according to, without limitation, the second mapping relationship, the start physical address (0030) of the memory space to be accessed, and the length of the physical address to be accessed. The address interval between the start physical address (0030) of the memory space to be accessed and the end physical address (0089) of the memory space to be accessed is equal to the length (60) of the physical address to be accessed; and the corresponding memory space from the start physical address (0030) of the memory space to be accessed to the end physical address (0089) of the memory space to be accessed is determined as the memory space to be accessed in the one memory space.

In one example embodiment, the access operation indicated by the access instruction information may be performed on the memory space to be accessed in, without limitation, the following way: if the access instruction information indicates a read operation, the read operation is performed on the memory space to be accessed to obtain read data; the read data is split into M data packets according to a transmission protocol between the first device and the second device. M is a positive integer greater than or equal to 1; and the M data packets are sent to the first device.

In one embodiment of this application, in this embodiment, if the access instruction information indicates the read operation, it may indicate that the first device wishes to perform the read operation on the memory space to be accessed in the target memory space in the memory of the second device, e.g., to read data stored in the memory space to be accessed. In such a case, the second device can read, without limitation, data from the memory space to be accessed, and the volume of the data read by the second device might be large. Therefore, the read data can be split into M data packets in accordance with, without limitation, the transmission protocol (e.g., transmission control protocol (TCP) between the first device and the second device, and then the M data packets are sent to the first device. In such a way, the success ratio of data transmission is increased.

In one example embodiment, performing the access operation indicated by the access instruction information on the memory space to be accessed may include, but is not limited to, one of the following cases.

In a first case, if the access instruction access indicates a write operation and the data access request further includes data to be written, the data to be written is written to the memory space to be accessed.

In one embodiment of this application, in this embodiment, the data to be written may be written to the memory space to be accessed in, without limitation, the following way: Q data packets sent by the first device are received. The Q data packets are obtained by splitting the data to be written included in the data access request according to the transmission protocol between the first device and the second device, and Q is a positive integer greater than or equal to 1; the Q data packets are packed to obtain the data to be written; and the data to be written is written to the memory space to be accessed.

In a second case, if the access instruction information indicates the write operation and the data access request includes no data to be written, indication information is sent to the first device. The indication information is configured to represent that the second device is ready for performing the write operation; M data packets sent by the first device are obtained. The M data packets are data packets obtained by splitting the data to be written according to the transmission protocol between the first device and the second device, and M is a positive integer greater than or equal to 1; the M data packets are packed to obtain the data to be written; and the data to be written is written to the memory space to be accessed.

Figure 9:
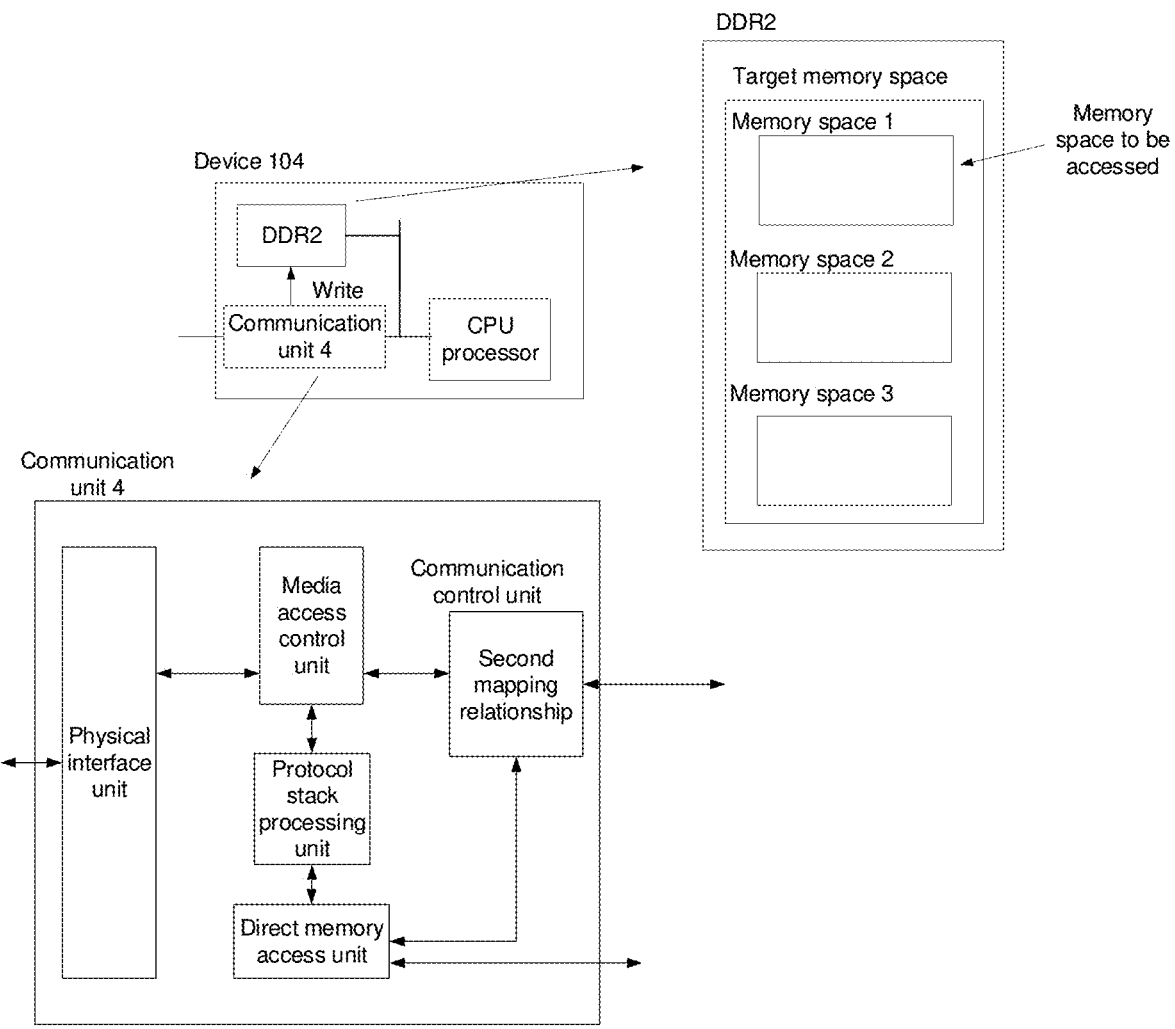
FIG. 9 is a schematic diagram of writing data to be written to a memory space to be accessed according to an embodiment of the present application.

In one embodiment of this application, in this embodiment, the data to be written can be written to the memory space to be accessed through, without limitation, a communication unit in the second device. FIG. 9 is a schematic diagram of writing data to be written to a memory space to be accessed according to an embodiment of the present application. As shown in FIG. 9, a communication unit 4, a memory (e.g., DDR2), and a CPU processor are deployed in a device 104 (equivalent to the second device). A physical interface unit, a media access control unit, a protocol stack processing unit, a direct memory access unit, and a communication control unit are deployed in the communication unit 4. A memory (e.g., DDR) of the device 104 includes a target memory space that includes a memory space 1, a memory space 2, and a memory space 3. The memory space 1 may be, but not limited to, the memory space to be accessed.

The physical interface unit is mainly a physical layer of the communication unit and may be, but not limited to, an optical module or an electrical interface of Ethernet. The media access control unit is mainly responsible for controlling and connecting a physical medium of the physical interface unit. The protocol stack processing unit is responsible for splitting data in accordance with a protocol requirement for sending to the media control unit, or receiving data packets from the media access control unit and packing the packets according to a protocol, and then the data is directly written to a corresponding memory space by the direct memory access unit according to related information. The direct memory access unit is responsible for reading data from a register of the protocol stack processing unit and directly writing the data to the memory or writing data from the memory to a sending register so as to send the data. The communication control unit stores a correspondence (e.g., a second mapping relationship) between a virtual address and a physical memory address, and then constantly reads data of a receiving register of the media control unit. A data command includes read-write direction information, virtual address start address information, and length information. The direct memory access unit is organized, according to a command sent by a device at an opposite end (e.g., a first device), to send data of a corresponding memory or receive data and write the data to the memory (e.g., the memory space 1).

The communication unit 4 may use, without limitation, the CPU-ByPass design in which reading and writing of a protocol stack and a memory do not involve a CPU, and reading and writing of a remote memory do not consume the CPU resources of the second device. The expansion of the memory of the first device is realized, and the performance of the second device would not decrease obviously, thereby reducing the influence on the second device.

In the technical solution provided by the step S306 above, if the data access request sent by the first device is obtained, it may indicate that the first device wishes to access the target memory space in the memory of the second device. In such a case, the memory space to be accessed in the target memory space can be determined according to the predetermined second mapping relationship, the second start virtual address, and the length of the physical address to be accessed, and then the read operation or the written operation, etc., indicated by the access instruction information is performed on the memory space to be accessed.

Compared with solution of extending a memory, e.g., RDMA technology, in the prior art, this technology simulates an idle memory of a remote physical machine as a local magnetic disk device which is set as a local virtual memory swap device. When a physical memory of a server is not enough, an operating system temporarily stores, through a page replacement algorithm, data of a physical page not commonly used onto a swap device, i.e., a remote memory. Since a network transmission speed is much higher than a read-write speed of magnetic disk input/output (I/O), using an idle memory on other physical host as a swap device may significantly reduce the performance reduction caused by magnetic disk I/O.

Since the RDMA technology swaps out this part of memory data and place it on a remote device, this method does not actually increase the memory space of a physical machine although it has a certain improvement on performance. This is in essence a CPU-Bypass network communication. The remote memory does not support that the CPU performs direct addressing access and operations. Processing data of the remote memory requires the data to be read locally first and then processed. By the method for direct access of remote memory in the embodiments of the present application, if the first device needs to access the memory on the remote device, direct addressing and access to the memory of the remote device can be directly performed with the first mapping relationship and the second mapping relationship, thereby realizing real extension of the memory of the device.

Figure 10:
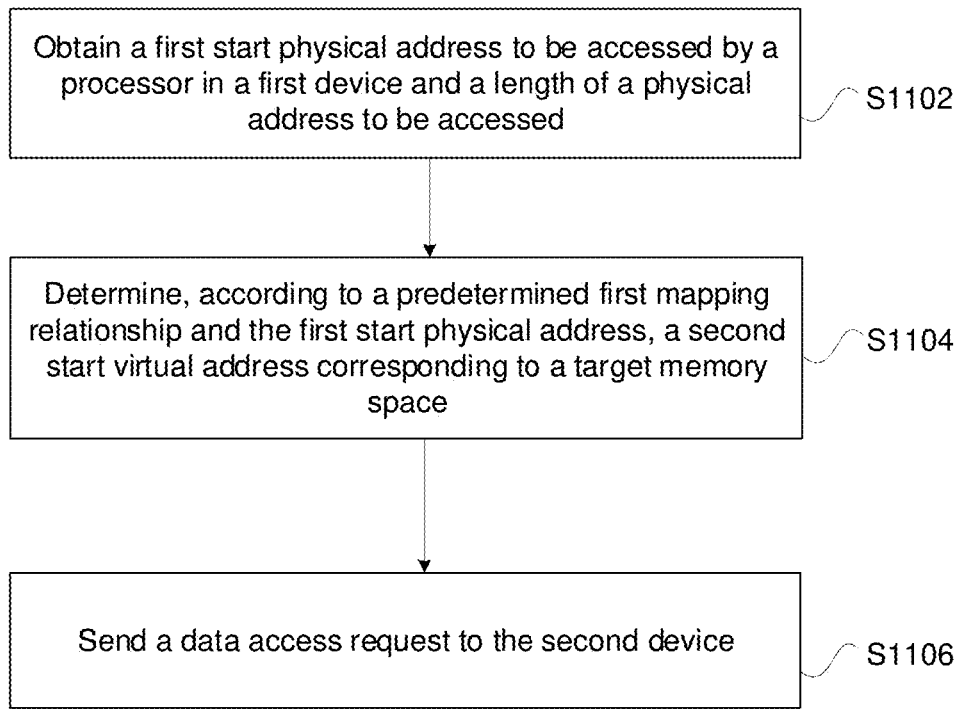
FIG. 10 is a flowchart II of a method for direct access of remote memory according to an embodiment of the present application.

Another method for direct access of remote memory run on a mobile terminal as described above is provided in this embodiment. FIG. 10 is a flowchart II of a method for direct access of remote memory according to an embodiment of the present application. As shown in FIG. 10, the flow includes the following steps.

At step S1102, a first start physical address to be accessed by a processor in a first device and a length of a physical address to be accessed are obtained. The first start physical address is a physical address determined according to a predetermined third mapping relationship and a first start virtual address to be accessed by the processor in the first device, and the third mapping relationship is at least a mapping relationship between a start virtual address allowed to be accessed by the first device and a start physical address allowed to be accessed by the first device.

At step S1104, a second start virtual address corresponding to a target memory space is determined according to a predetermined first mapping relationship and the first start physical address. The first mapping relationship is at least a mapping relationship between a start physical address allowed to be accessed by the first device, a length of a physical address allowed to be accessed by the first device, and a second start virtual address corresponding to the target memory space; and the target memory device is a memory space in a memory of a second device and a memory space allowed to be accessed by the first device.

At step S1106, a data access request is sent to the second device. The data access request is configured to request access to the target memory space in the memory of the second device and includes the second start virtual address, the length of the physical address to be accessed, and access instruction information for indicating that a read operation or a write operation is performed on a memory space to be accessed in the target memory space; the memory space to be accessed is a memory space in the target memory space that is determined according to a predetermined second mapping relationship, the second start virtual address, and the length of the physical address to be accessed; and the second mapping relationship is at least a mapping relationship between a second start virtual address, a start physical address of the target memory space, and a length of a physical address of the target memory space.

By the steps above, if the first device wishes to access the target memory space in the memory of the second device, the second start virtual address can be determined according to, without limitation, the predetermined first mapping relationship and the first start physical address to be accessed, and then the data access request is sent to the second device, thereby requesting access to the target memory space in the memory of the second device. In such a way, direct addressing and access to the memory space to be accessed in the target memory space on the second device are realized according to the predetermined first, second, and third mapping relationships. Therefore, the problem that the first device cannot access the memory space in the memory of the second device that is allowed to be accessed by the first device may be solved, thereby achieving the effect that the first device may access the memory space in the memory of the second device that is allowed to be accessed by the first device.

The execution subject of the steps above may be, but not limited to, a terminal, a server, etc.

In the technical solution provided by the step S1102 above, if the first device wishes to access the memory of the second device, without limitation, the first start physical address to be accessed by the processor (e.g., CPU) in the first device and the length of the physical address to be accessed can be obtained.

In one embodiment of this application, in this embodiment, the processor in the device may send, without limitation, the first start virtual address to be accessed and the length of the physical address to be accessed. The first start physical address to be accessed by the processor (e.g., CPU) in the first device can be determined and obtained according to, without limitation, the predetermined third mapping relationship and the first start virtual address to be accessed. The third mapping relationship is at least a mapping relationship between a start virtual address allowed to be accessed by the first device and a start physical address allowed to be accessed by the first device.

Figure 11:
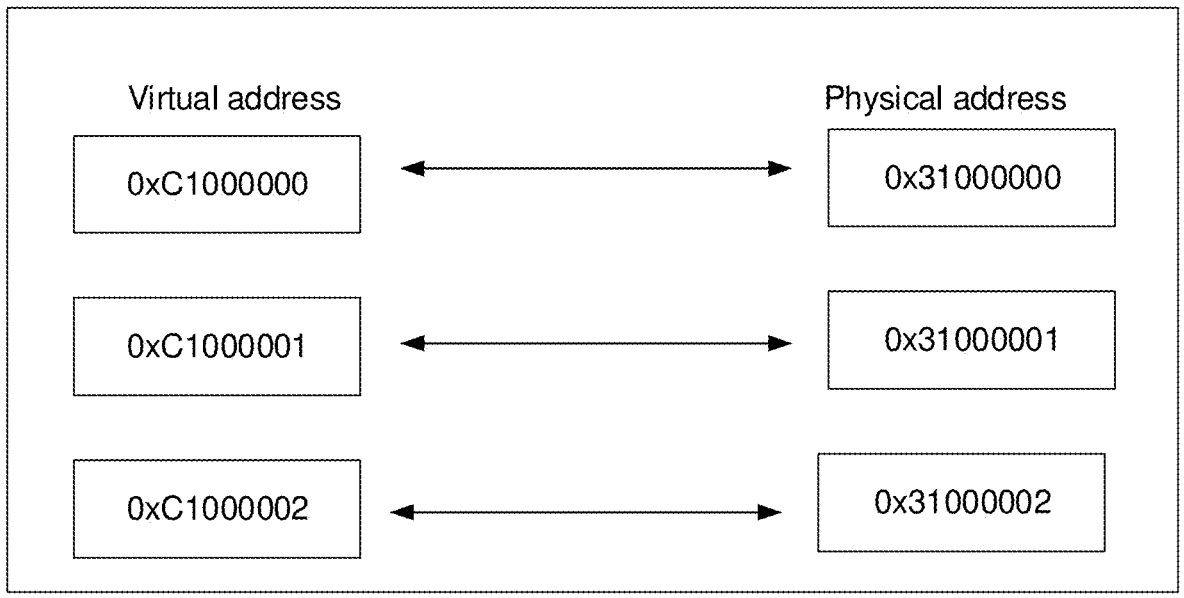
FIG. 11 is a schematic diagram of a third mapping relationship according to an embodiment of the present application.

An address sent by the processor (e.g., CPU) in the first device when accessing the memory is a virtual address, and a main memory manager in the first device converts a virtual machine address to a physical address through a page table technology and then accesses a physical memory. FIG. 11 is a schematic diagram of a third mapping relationship according to an embodiment of the present application. As shown in FIG. 11, in detail, the third mapping relationship is at least a mapping relationship between a virtual address allowed to be accessed by the first device and a physical address allowed to be accessed by the first device. For example, the virtual address allowed to be accessed by the first device may include, but is not limited to, 0xC1000000, 0xC1000001, and 0xC1000002. The physical address corresponding to 0xC1000000 is 0x31000000; the physical address corresponding to 0xC1000001 is 0x31000001; and the physical address corresponding to 0xC1000002 is 0x31000002. In detail, the virtual address (equivalent to the first start virtual address to be accessed) sent by the CPU is composed of two parts: virtual page number (VPN) and an offset. The VPN is an entry number in a page table, and the offset is an offset in a page. The final converted physical address (equivalent to the first start physical address to be accessed) also has two parts: a physical frame number (PFN) and an offset. The PFN is a physical page frame number, and the offset is the same as the offset of the virtual address above, i.e., the offset in a page. An address space may be of 32 bits or 64 bits. The page table can be designed to be of one level or multiple levels as needed.

In the technical solution provided by the step S1104 above, if the first device wishes to access the memory of the second device, without limitation, the first start physical address to be accessed by the processor (e.g., CPU) in the first device and the length of the physical address to be accessed can be obtained. In such a case, the second start virtual address can be determined according to, without limitation, the predetermined first mapping relationship and the first start physical address to be accessed. It will be understood that the first mapping relationship may be stored on, without limitation, the first device.

In one embodiment of this application, in this embodiment, if the first device is allowed to access memory spaces of a plurality of devices, the first mapping relationship may also be at least a mapping relationship between a start physical address allowed to be accessed by the first device, a length of the physical address allowed to be accessed by the first device, a device (e.g., an internet protocol ( ) address, a port, etc., of the device) allowed to be accessed by the first device, and a start virtual address corresponding to the target memory space.

In the technical solution provided by the step S1106 above, if the first device wishes to access the memory of the second device, without limitation, the first start physical address to be accessed by the processor (e.g., CPU) in the first device and the length of the physical address to be accessed can be obtained. In such a case, the first device can determine the second start virtual address according to, without limitation, the predetermined first mapping relationship and the first start physical address to be accessed. In such a case, the first device can send, without limitation, the data access request to the second device. The data access request includes the second start virtual address corresponding to the target memory space, the length of the physical address to be accessed, and the access instruction information such that the second device, when obtaining the data access request, can determine, according to the predetermined second mapping relationship, the second start virtual address, and the length of the physical address to be accessed, the memory space to be accessed in the target memory space and then perform the access operation (e.g., the read operation or the write operation) indicated by the access instruction information on the memory space to be accessed.

In one embodiment of this application, in this embodiment, after the data access request is sent to the second device, an access result returned by the second device in response to the data access request can also be obtained without limitation. The access result is a result obtained by the second device performing the access operation indicated by the access instruction information on the memory space to be accessed; the memory space to be accessed is a memory space in the target memory space that is determined according to the predetermined second mapping relationship, the second start virtual address, and the length of the physical address to be accessed; and the second mapping relationship is at least a mapping relationship between a second start virtual address, a start physical address of the target memory space, and a length of the physical address of the target memory space.

In one embodiment of this application, in this embodiment, the second device can return the access result to the first device through, without limitation, network communication, e.g., optical fiber communication. Such a way exhibits the advantages of high access speed, long communication distance, and strong antijamming capability. In such a way, it is realized that the first device operates to access the target memory space in the memory of the second device as a normal local memory, thereby achieving real extension of the memory of the first device, and it is realized that the available memory of the first device may be greatly increased with an idle memory of a device in a cluster, thereby meeting requirements of big data application programs in the first device.

In one example embodiment, the data access request can be sent to the second device in, without limitation, the following way: if the first start physical address is a start physical address to be read by the processor and a first data set corresponding to the first start physical address and the length of the physical address to be accessed is not cached in a cache space of the first device, the data access request is sent to the second device. The first data set includes data obtained by performing the read operation on the memory space to be accessed in advance.

In one embodiment of this application, in this embodiment, the cache space of the first device can be configured to, without limitation, cache the obtained data returned by the second device in response to the data access request. For example, the cache space is a static random-access memory (SRAM), etc.

Figure 12:
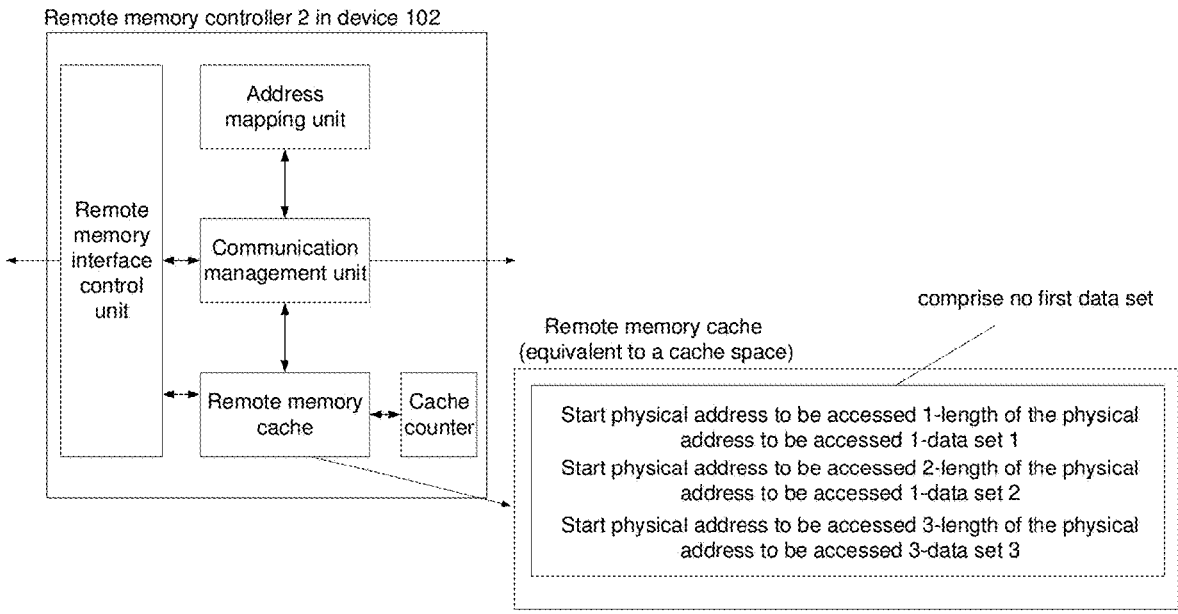
FIG. 12 is a schematic diagram of finding a first data set from a cache space according to an embodiment of the present application.

In one embodiment of this application, in this embodiment, if the first start physical address to be accessed by the processor is the start physical address to be read by the processor, it may indicate that the first device wishes to read the first data set from the memory space to be accessed. Without limitation, the first data set corresponding to the first start physical address to be accessed and the length of the physical address to be accessed can be firstly found from the cache space of the first device. FIG. 12 is a schematic diagram of finding a first data set from a cache space according to an embodiment of the present application. As shown in FIG. 12, a remote memory interface control unit, an address mapping unit, a communication management unit, a remote memory cache (equivalent to the cache space), and a cache counter are deployed in a remote memory controller 2 of a device 102 (equivalent to the first device).

Data sets that were obtained and returned by the second device (or other devices) in response to the data access request from the device 102 are cached in the remote memory cache. These data sets may include, but are not limited to, start physical address to be accessed 1-length of the physical address to be accessed 1-data set 1, start physical address to be accessed 2-length of the physical address to be accessed 1-data set 2, and start physical address to be accessed 3-length of the physical address to be accessed 3-data set 3. If the first data set is found, the first data set is directly read from the cache space. If the first data set is not found, the data access request is sent to the second device.

In one example embodiment, the access result returned by the second device in response to the data access request may be obtained in, without limitation, the following way: if the access instruction information indicates the read operation, M data packets sent by the second device are received. The M data packets are data packets obtained by splitting read data according to a transmission protocol between the first device and the second device; the read data is data obtained by the second device performing the read operation on the memory space to be accessed; and M is a positive integer greater than or equal to 1; the M data packets are packed to obtain the first data set; and the first start physical address, the length of the physical address to be accessed, and the first data set are cached into the cache space of the first device.

Figure 13:
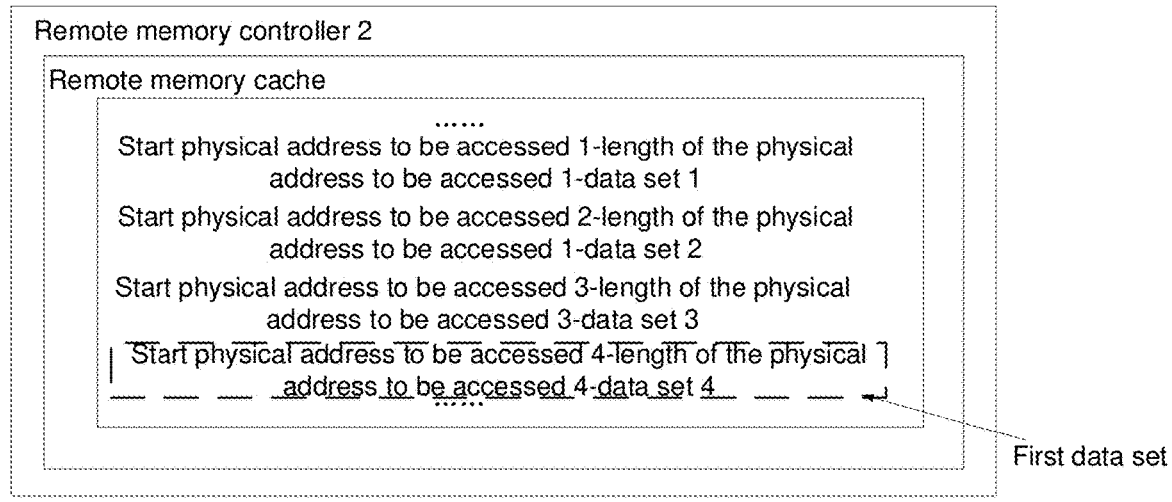
FIG. 13 is a schematic diagram of caching a first data set according to an embodiment of the present application.

In one embodiment of this application, in this embodiment, if the first data set corresponding to the first start physical address to be accessed and the length of the physical address to be accessed is not cached in the cache space of the first device, without limitation, the received M data packets returned by the second device can be packed, and then the resulting data set is cached into the cache space. FIG. 13 is a schematic diagram of caching a first data set according to an embodiment of the present application. As shown in FIG. 13, start physical address to be accessed 1-length of the physical address to be accessed 1-data set 1, start physical address to be accessed 2-length of the physical address to be accessed 2-data set 2, and start physical address to be accessed 3-length of the physical address to be accessed 3-data set 3 are stored in the remote memory cache (equivalent to the cache space) of the remote memory controller 2 of the device 102 (equivalent to the first device).

Without limitation, the received M data packets sent by the second device can be packed in an ascending order by serial number to obtain the first data set. Each of the M data packets has a corresponding serial number. The first data set can be, but not limited to, start physical address to be accessed 4-length of the physical address to be accessed 4-data set 4. The first data set is cached in the cache space.

Sending the data access request to the second device may be performed in, without limitation, one of the following ways.

In a first way, if the first start physical address is a start physical address to be written by the processor and the first data set corresponding to the first start physical address and the length of the physical address to be accessed is cached in the cache space of the first device, the first data set cached in the cache space of the first device is modified to a second data set to be written by the processor, and the data access request is sent to the second device. The first data set includes data obtained by performing the read operation on the memory space to be accessed.

In one embodiment of this application, in this embodiment, if the first device wishes to perform the write operation on the memory space to be accessed, without limitation, the first data set corresponding to the first start physical address and the length of the physical address to be accessed can be firstly found from the cache space of the first device. If the first data set is found, the first data set in the cache space of the first device is directly modified, and then the data access request is sent to the second device. It is realized that if the first data set in the cache space of the first device has been modified, the modified second data set is synchronized into the memory of the second device in time, thereby improving the timeliness of data synchronization.

In a second way, if the first start physical address is the start physical address to be written by the processor and the first data set corresponding to the first start physical address and the length of the physical address to be accessed is not cached in the cache space of the first device, the first data set is obtained from the second device and cached into the cache space of the first device; the first data set cached in the cache space of the first device is modified to the second data set to be written by the processor, and the data access request is sent to the second device.

In one embodiment of this application, in this embodiment, if the first device wishes to perform the write operation on the memory space to be accessed, without limitation, the first data set corresponding to the first start physical address and the length of the physical address to be accessed can be firstly found from the cache space of the first device. If the first data set is found, and if the first data set is not found, the first data can be obtained from the second device and then cached into the cache space of the first device; next, the first data set in the cache space of the first device is modified, and then the data access request is sent to the second device, thereby realizing the synchronization of the modified data.

In one example embodiment, sending the data access request to the second device may include, but is not limited to, one of the following cases.

In a first case, if the cache space is full, the data access request is sent to the second device. The data access request is configured to request to perform the write operation on the target memory space.

In one embodiment of this application, in this embodiment, without limitation, if a data volume stored in the cache space is greater than or equal to a data volume threshold, it may indicate that the cache space is full. In such a case, without limitation, the data access request can be sent to the second device, and at least part of data in the cache space is written to the target memory space, thereby avoiding that the data in the cache space cannot be synchronous with the data in the target memory space.

In a second case, if the first data set cached in the cache space of the first device is successfully modified to the second data set to be written by the processor, the data access request is sent to the second device.

In one embodiment of this application, in this embodiment, without limitation, if the first data set cached in the cache space of the first device is successfully modified to the second data set to be written by the processor, the data access request is immediately sent to the second device. In such a way, it is realized that the successfully modified data set is synchronously written to the target memory space in time, thereby improving the timeliness of updating the data in the target memory space.

In one example embodiment, the data in the cache space may be processed in, without limitation, the following way: if the first data set cached in the cache space of the first device is modified to the second data set to be written by the processor, a modification tag is set for the second data set in the cache space; and if the cache space is full, or if the cache space is full and data to be cached into the cache space exists, at least part of data without the modification tag is deleted from the cache space.

Figure 14:
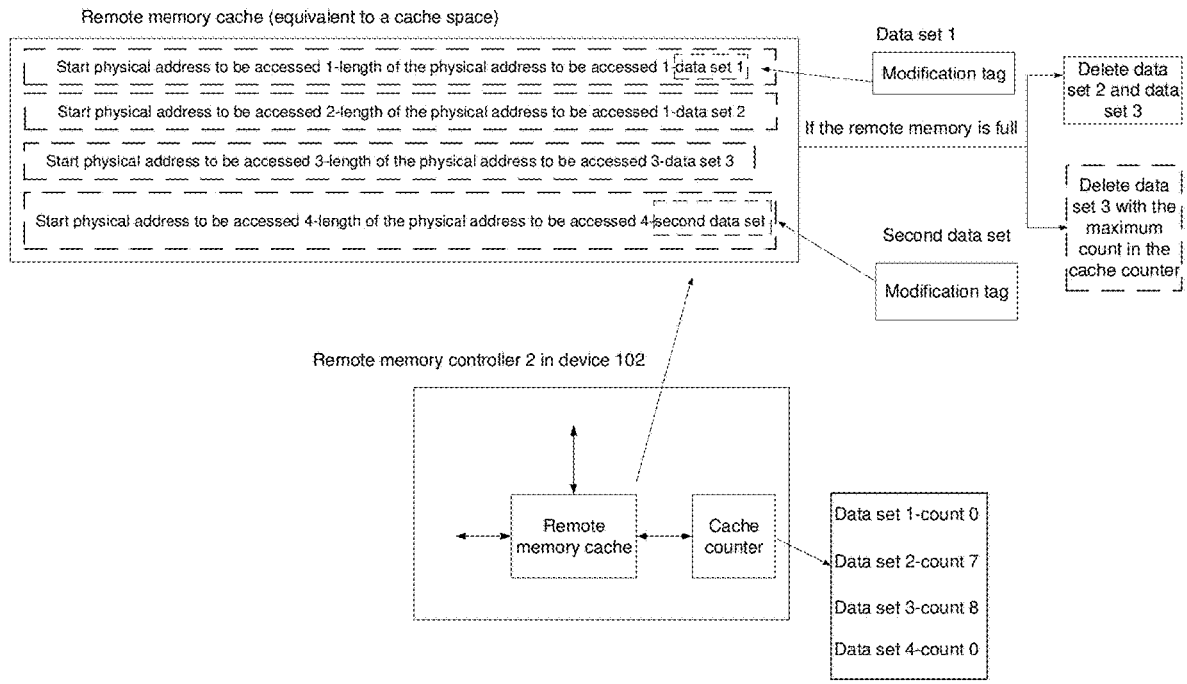
FIG. 14 is a schematic diagram of deleting data in a cache space according to an embodiment of the present application.

In one embodiment of this application, in this embodiment, without limitation, the modification tag can be set for the modified data in the cache space. If the cache space is full, without limitation, the data set without the modification tag in the cache space can be deleted. FIG. 14 is a schematic diagram of deleting data in a cache space according to an embodiment of the present application. As shown in FIG. 14, a remote memory cache (equivalent to the cache space) and a cache counter are deployed in the remote memory controller 2 of the device 102 (equivalent to the first device), and start physical address to be accessed 1-length of the physical address to be accessed 1-data set 1, start physical address to be accessed 2-length of the physical address to be accessed 2-data set 2, start physical address to be accessed 3-length of the physical address to be accessed 3-data set 3, and start physical address to be accessed 4-length of the physical address to be accessed 4-second data set are cached in the remote memory cache. The data set 1 and the second data set are modified data sets. Without limitation, the modification tags can be set for the data set 1 and the second data set, and the data set 2 and the data set 3 are unmodified data sets, and therefore, no modification tag is set for the data set 2 and the data set 3.

In addition, when the first device accesses the remote memory cache each time, the cache counter will increase a count by 1 for each piece of cached data in the remote memory cache, reset a count for accessed cached data, and set the modification tag for a modified cached entry. In detail, the cache counter records the count (0) for the data set 1, the count (7) for the data set 2, the count (8) for the data set 3, and the count (0) for the data set 4.

Since the space of the remote memory space is limited, when the cache is full and new read data needs to be cached again, the communication management unit selects the cache counter and deletes the cached data with a maximum count value (i.e., the cached data that has not been accessed for the longest time), e.g., the data set 3 with the maximum count in the cache counter. If an entry has no modification tag, the entry is directly deleted. For example, the data set 2 and the data set 3 are deleted. If a cached entry has the modification tag, the information of the cached entry includes an IP address of a remote memory, a port number, and a start virtual address (equivalent to the second start virtual address), and then the cached data is written to the remote memory through the communication unit.

In one example embodiment, the first mapping relationship may be established in, without limitation, the following way: a memory extension request is initiated to the second device. The memory extension request includes the second start virtual address and the length of the physical address allowed to be accessed by the first device; and if the second device successfully allocates the target memory space for the first device in response to the memory extension request, the first mapping relationship is established on the first device. The target memory space is a memory space in an idle state in the memory of the second device; and the length of the physical address of the target memory space is equal to the length of the physical address allowed to be accessed by the first device.

In one embodiment of this application, in this embodiment, if the memory of the first device is not enough, without limitation, the memory extension request can be initiated to the second device so that the second device can allocate the desired memory space for the first device from the idle memory spaces in the memory of the second device. In such a case, if the second device successfully allocates the target memory space for the first device in response to the memory extension request, the first mapping relationship is established on the first device. In such a case, the utilization ratio of the memory spaces in the idle state on the device is improved.

In one example embodiment, the data access request may be sent to the second device in, without limitation, the following way: an address interval between the first start physical address and the start physical address allowed to be accessed by the first device in the first mapping relationship is determined as a physical address offset, and the physical address offset is carried in the data access request; and the data access request is sent to the second device; or the first start physical address is carried in the data access request; and the data access request is sent to the second device.

In one embodiment of this application, in this embodiment, without limitation, the first start physical address to be accessed can be carried in the data access request. If the second device obtains the data access request, the address interval between the first start physical address to be accessed and the start physical address allowed to be accessed by the first device in the first mapping relationship is determined as the physical address offset. It will be understood that the first mapping relationship may be on the second device, or the second device may access the first mapping relationship on the first device, and so on.

In one example embodiment, the data access request may be sent to the second device in, without limitation, the following way: if P mapping relationships are predetermined and are in one-to-one correspondence with preestablished P communication tasks, the data access request is sent to the second device through a communication task of the P communication tasks that corresponds to the first mapping relationship. P is a positive integer greater than or equal to 2, and the P mapping relationships include the first mapping relationship.

In one embodiment of this application, in this embodiment, different mapping relationships correspond to different communication tasks. It will be understood that the data access request can be sent to the second device through, without limitation, the communication task corresponding to the first mapping relationship.

In one example embodiment, a device for direct access of remote memory is further provided, including a first processor, a main memory manager, a remote memory controller, and a first communication unit. The first processor is connected to the main memory manager that is connected to the remote memory controller, and the remote memory controller is connected to the first communication unit. The main memory manager is configured to determine, according to a predetermined third mapping relationship and a first start virtual address to be accessed by the first processor, a first start physical address to be accessed by the first processor. The third mapping relationship is at least a mapping relationship between a start virtual address allowed to be accessed by device for direct access of remote memory and a start physical address allowed to be accessed by the device for direct access of remote memory; the remote memory controller is configured to determine, according to a predetermined first mapping relationship and the first start physical address, a second start virtual address corresponding to a target memory space. The first mapping relationship is at least a mapping relationship between a start physical address allowed to be accessed by the device for direct access of remote memory, a length of a physical address allowed to be accessed by the device for direct access of remote memory, and a second start virtual address corresponding to the target memory space; and the target memory device is a memory space in a memory of a second device and a memory space allowed to be accessed by the device for direct access of remote memory; and the first communication unit is configured to send a data access request to the second device. The data access request is configured to request access to the target memory space in the memory of the second device and includes the second start virtual address corresponding to the target memory space, a length of a physical address to be accessed, and access instruction information.

In one example embodiment, a remote data storage device is further provided, including a second communication unit and a memory. The second communication unit includes a media access control unit, a communication control unit, and a direct memory access unit; the media access control unit is configured to obtain a data access request sent by a first device. The data access request is configured to request access to a target memory space in the memory, and the target memory space is a memory space allowed to be accessed by the first device; the communication control unit is configured to: if the data access request includes a second start virtual address corresponding to the target memory space, a length of a physical address to be accessed, and access instruction information, determine, according to a predetermined second mapping relationship, the second start virtual address, and the length of the physical address to be accessed, a memory space to be accessed in the target memory space. The second start virtual address is a virtual address determined according to a predetermined first mapping relationship and a first start physical address to be accessed by a processor in the first device; the first mapping relationship is at least a mapping relationship between a start physical address allowed to be accessed by the first device, a length of a physical address allowed to be accessed by the first device, and a second start virtual address corresponding to the target memory space; the second mapping relationship is at least a mapping relationship between a second start virtual address, a start physical address of the target memory space, and a length of a physical address of the target memory space; the first start physical address is a physical address determined according to a predetermined third mapping relationship and a first start virtual address; and the third mapping relationship is at least a mapping relationship between a start virtual address allowed to be accessed by the first device and a start physical address allowed to be accessed by the first device; and the direct memory access unit is configured to perform an access operation indicated by the access instruction information on the memory space to be accessed.

For a better understanding of the method for direct access of remote memory in the embodiments of the present application, the method for direct access of remote memory in the embodiments of the present application is further explained and described in conjunction with an embodiment, which may be applicable to, without limitation, the embodiments of the present application.

At step S1501, a remote memory contributor (equivalent to a second device) applies for a user memory space (equivalent to a target memory space), and transfers a virtual address and a length to an operating system kernel, and queries a corresponding memory physical space and stores it with an array linked list. The linked list includes a linked list head (including a start address of the virtual address and a size of the memory space), and a linked list unit that includes a start address, a length, and next memory block start address, and the information of the data linked list is sent to a communication control unit. Finally, the remote memory contributor waits for receiving a command sent by a remote memory demander and works according to the command.

At step S1502, the remote memory demander (equivalent to a first device) manually configures or negotiates, over a network, a correspondence between a local physical address and a remote memory. Each entry records a local physical address with an IP address of a remote memory, a port number, a start virtual address (equivalent to a second start virtual address), and a length. The information is stored in an address mapping unit of a remote memory controller. After the configuration is completed, a communication management unit may check whether the configuration information changes, and if yes, perform corresponding processing, thereby guaranteeing that each remote memory has one communication task that establishes connection with the remote memory contributor.

At step S1503, when a memory physical address read by a CPU of the remote memory demander points to the remote memory, a remote memory interface control unit firstly reads a remote memory cache (equivalent to a cache space) to check whether there is a cached record, and if there is cached data corresponding to the physical address, directly returns the data to the CPU. The cache is in units of 4 KB address, and the cached information includes physical address start address information, the information (including an IP address, a port, and a virtual address start address) of the corresponding remote memory, and 4 KB data. If there is no data in the remote memory cache, the remote memory interface control unit sends the physical address and length information (an integral multiple of 4 KB) to the communication management unit such that the communication management unit initiates communication through the communication task corresponding to the address to read the data of the remote memory. The communication management unit firstly checks the configuration information in the address mapping unit, obtains the network address, the port, and the start virtual address of the remote memory contributor corresponding to the physical address, and then initiates a communication command through a communication unit to notify the communication unit of the remote memory contributor. The command information includes a local network address, a communication task number, a memory physical address, a network address, a port, and a start virtual address of the remote memory contributor, a memory length, and a read command word.

After the communication unit of the remote memory contributor receives this data, which is found to be a memory read command, the memory read command is sent by a media access control unit to the communication control unit. The communication control unit looks up address translation information according to the information of the read command, computes a physical memory address chain to be read, and then fills read physical memory hash table information and sends it, together with information such as a network address of the remote memory demander, a communication task number, a memory physical address, and the network address and the port of the remote memory contributor, to a direct memory access unit. The direct memory access unit will read data in a corresponding memory and send it to a protocol stack processing unit. The protocol stack processing unit splits the memory data into one or more data packets according to a protocol requirement. Each data packet includes the network address of the remote memory demander, the communication task number, the memory physical address, the memory length, the network address of the remote memory contributor, the port, the memory data, the serial number, and the command word, etc. Then, the data packets are sent out through a media access control layer and a physical layer.

After receiving the data packets of the remote memory contributor, the remote memory demander packs the packets according to the relevant information such as the communication task number, the memory physical address, the memory length, the network address of the remote memory contributor, the port number, the memory data, the serial number, and the command word to obtain the start address of the remote memory to be read, the length, and the data, and then writes and stores them in a remote memory cache space while returning suitable data to the CPU, thereby completing addressing access to the remote memory by the CPU.

At step S1504, when the memory physical address written by the CPU points to the remote memory, the remote memory interface control unit firstly checks whether there is a cache in the remote memory cache, and if yes, directly modifies data in the cache; if there is no data in the remote memory cache, step S1503 is performed; the data in the remote memory is read by the communication unit and then stored in the remote memory cache, and finally, the corresponding data is modified in the remote memory cache.

At step S1505, when the cache is full of data and the data in the cache thus needs to be written back to the remote memory, the communication management unit initiates communication through the communication task corresponding to this address to write remote memory data. The communication management unit firstly checks the configuration information in the address mapping unit, obtains the network address, the port, and the start virtual address of the remote memory contributor corresponding to the physical address, and then initiates a communication command through a communication unit to notify the communication unit of the remote memory contributor. The command information includes a local network address, a communication task number, a memory physical address, a network address, a port, and a start virtual address of the remote memory contributor, a memory length, and a write command word.

After the communication unit of the remote memory contributor receives this data, which is found to be a memory write command, the memory read command is sent by a media access control unit to the communication control unit. The communication control unit looks up address translation information according to the information of the write command, computes a physical memory space address chain to be read, and then fills write physical memory hash table information. Then, a write action of the direct memory access unit is started. The direct memory access unit is ready for reading the memory data received in the corresponding protocol stack processing unit and writing it to the corresponding physical memory space. After the remote memory contributor is ready, the communication control unit sends information of a command prepared by a write memory, which includes the IP address of the remote memory demander, the communication task number, the IP address of the remote memory contributor, the port number, the prepared control word of the write command, the memory address, and the length information, to the remote memory demander through the media access control layer and a physical interface layer.

After receiving the command information prepared by the write memory of the remote memory contributor, the remote memory demander splits the memory data packet into one or more data packets according to a protocol requirement. Each data packet includes the network address of the remote memory demander, the communication task number, the memory physical address, the memory length, the network address of the remote memory contributor, the port, the memory data, the serial number, and the command word, etc. Then, the data packets are sent out through the media access control layer and the physical layer. The remote demander waits for a reception acknowledgment packet of the remote memory demander after sending each data packet, and then sends next data packet, thereby ensuring the integrity of the data.

After receiving the data packets of the remote memory demander, the media control access unit of the remote memory contributor sends, on the one hand, data packet reception acknowledgment information to the remote memory demander (repeated data packets will be discarded), and on the other hand, transmits the received data packets to the protocol stack processing unit. This unit packs the packets according to the relevant information such as the communication task number, the memory physical address, the memory length, the network address of the remote memory contributor, the port number, the memory data, the serial number, and the command word. After each finished data packet is received, the direct memory access unit is started to write the data to the corresponding memory space, thus completing the write operation.

Figure 15:
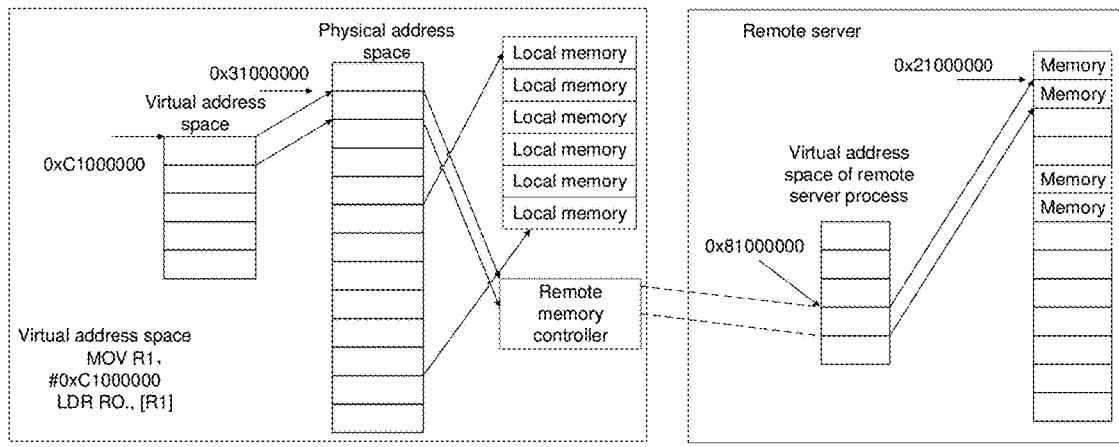
FIG. 15 is a schematic diagram of accessing a remote memory according to an embodiment of the present application.

In detail, in this embodiment, it is taken as an example that the first device and the second device are servers. For example, a process of a local server (equivalent to the first device) which is an ARM32 bit CPU reading a remote memory in a remote server (equivalent to the second device) is described. FIG. 15 is a schematic diagram of accessing a remote memory according to an embodiment of the present application. As shown in FIG. 15, when a memory management unit (MMU) page table maps the first start virtual address 0xC1000000 to be accessed to the first start physical address 0x31000000 to be accessed, and the physical address 0x31000000 is allocated to a remote memory controller. The remote memory controller maps and configures an address space (the first start physical address 0x31000000, with the length of 4 KB) to a virtual address space (the second start virtual address 0x81000000, with the length of 4 KB) of a target machine process space (the IP address is 192.168.1.2, and the port number is 30000). The start physical address of the virtual address space (the second start virtual address 0x81000000, with the length of 4 KB) of the target machine process space that corresponds to the actual physical memory space is 0x21000000, and its length is 4 KB. When the CPU executes the following instruction:

MOVR1, #0xC1000000
LDRR0, [R1]

the MMU of the CPU automatically translates the first start virtual address 0xC1000000 to be accessed to the first start physical address 0x31000000 to be accessed. 0xC1000000 will appear on an address line and a control signal will be sent over a control line. The remote memory controller is gated, and the remote memory interface control unit therein determines whether the CPU accesses the remote memory interface control unit after receiving related signals of the address line and a data line. If the CPU accesses the remote memory interface control unit, whether there is a cache in the remote memory cache of the remote memory controller is queried firstly, and if yes, data is placed on the data line and a corresponding signal is sent over the control line to notify the CPU that reading is completed. If the CPU does not access the remote memory interface control unit, the remote memory controller initiates communication to a target machine (the IP address is 192.168.1.2, and the port number is 30000) to obtain the data in the physical memory corresponding to the virtual memory address 0x81000000 of a target machine process (the start address is 0x21000000, and its length is 4 KB). The remote memory controller receives and caches the data, and then places a first piece of 32-bit data on the data line and sends a signal over the control line to notify the CPU that reading is completed. At this point, one read operation on the remote memory by the CPU is completed.

Through the description above of the embodiments, those skilled in the art could clearly learn that the method in the embodiments above may be implemented with software and a necessary general-purpose hardware platform or with hardware, while in many cases the former is a preferable implementation. Based on such an understanding, the essence or a portion contributing to the existing technology of the technical solutions of the embodiments of the present application may be embodied in the form of a software product. The computer software product is stored in a storage medium (such as a ROM/RAM, a diskette, or an optical disk), and includes several instructions used to enable a terminal apparatus (which may be a cell phone, a computer, a server, a network device, etc.) to execute the method of each embodiment of the present application.

This embodiment further provides a data access apparatus which is configured to implement the embodiments above and embodiments, and the description is no longer repeated here. As used hereinafter, the term "module" may be a combination of software and/or hardware that implements a preset function. Although the apparatus described in the following embodiment is implemented in software, an implementation in hardware or a combination of software and hardware is possible and conceivable.

This embodiment further provides a data access apparatus which is configured to implement the embodiments above and embodiments, and the description is no longer repeated here. As used hereinafter, the term "module" may be a combination of software and/or hardware that implements a preset function. Although the apparatus described in the following embodiment is implemented in software, an implementation in hardware or a combination of software and hardware is possible and conceivable.

Another data access apparatus provided by an embodiment of the present application includes:

a first obtaining module, configured to obtain a first start physical address to be accessed by a processor in a first device and a length of a physical address to be accessed. The first start physical address is a physical address determined according to a predetermined third mapping relationship and a first start virtual address to be accessed by the processor in the first device, and the third mapping relationship is at least a mapping relationship between a start virtual address allowed to be accessed by the first device and a start physical address allowed to be accessed by the first device;

a first determination module, configured to determine, according to a predetermined first mapping relationship and the first start physical address, a second start virtual address corresponding to a target memory space. The first mapping relationship is at least a mapping relationship between a start physical address allowed to be accessed by the first device, a length of a physical address allowed to be accessed by the first device, and a second start virtual address corresponding to the target memory space; and the target memory device is a memory space in a memory of a second device and a memory space allowed to be accessed by the first device; and a sending module, configured to send a data access request to the second device. The data access request is configured to request access to the target memory space in the memory of the second device and includes the second start virtual address, the length of the physical address to be accessed, and access instruction information for indicating that a read operation or a write operation is performed on a memory space to be accessed in the target memory space; the memory space to be accessed is a memory space in the target memory space that is determined according to a predetermined second mapping relationship, the second start virtual address, and the length of the physical address to be accessed; and the second mapping relationship is at least a mapping relationship between a second start virtual address, a start physical address of the target memory space, and a length of a physical address of the target memory space.

By the steps above, if the first device wishes to access the target memory space in the memory of the second device, the second start virtual address can be determined according to, without limitation, the predetermined first mapping relationship and the first start physical address to be accessed, and then the data access request is sent to the second device, thereby requesting access to the target memory space in the memory of the second device. In such a way, direct addressing and access to the memory space to be accessed in the target memory space on the second device are realized according to the predetermined first, second, and third mapping relationships. Therefore, the problem that the first device cannot access the memory space in the memory of the second device that is allowed to be accessed by the first device can be solved, thereby achieving the effect that the first device may access the memory space in the memory of the second device that is allowed to be accessed by the first device.

In one example embodiment, the sending module includes:

a first sending unit, configured to: if the first start physical address is a start physical address to be read by the processor and a first data set corresponding to the first start physical address and the length of the physical address to be accessed is not cached in a cache space of the first device, send the data access request to the second device. The first data set includes data obtained by performing the read operation on the memory space to be accessed in advance.

In one example embodiment, the apparatus further includes:

a receiving module, configured to: after sending the data access request to the second device, if the access instruction information indicates the read operation, receive M data packets sent by the second device. The M data packets are data packets obtained by splitting read data according to a transmission protocol between the first device and the second device; the read data is data obtained by the second device performing the read operation on the memory space to be accessed; and M is a positive integer greater than or equal to 1;

a packet packing module, configured to pack the M data packets to obtain the first data set; and a cache module, configured to cache the first start physical address, the length of the physical address to be accessed, and the first data set into the cache space of the first device.

In one example embodiment, the sending module includes:

a first processing unit, configured to: if the first start physical address is a start physical address to be written by the processor and the first data set corresponding to the first start physical address and the length of the physical address to be accessed is cached in the cache space of the first device, modify the first data set cached in the cache space of the first device to a second data set to be written by the processor, and send the data access request to the second device. The first data set includes data obtained by performing the read operation on the memory space to be accessed; or a second processing unit, configured to: if the first start physical address is the start physical address to be written by the processor and the first data set corresponding to the first start physical address and the length of the physical address to be accessed is not cached in the cache space of the first device, obtain the first data set from the second device, cache the first data set into the cache space of the first device, modify the first data set cached in the cache space of the first device to the second data set to be written by the processor, and send the data access request to the second device.

In one example embodiment, the sending module includes:

a second sending unit, configured to: if the cache space is full, send the data access request to the second device. The data access request is configured to request to perform the write operation on the target memory space; or a third sending unit, configured to: if the first data set cached in the cache space of the first device is success-fully modified to the second data set to be written by the processor, send the data access request to the second device.

In one example embodiment, the apparatus further includes:

a setting module, configured to: if the first data set cached in the cache space of the first device is successfully modified to the second data set to be written by the processor, set a modification tag for the second data set in the cache space; and a deletion module, configured to: if the cache space is full, or if the cache space is full and data to be cached into the cache space exists, delete at least part of data without the modification tag from the cache space.

In one example embodiment, the apparatus further includes:

an initiation module, configured to: before sending the data access request to the second device, initiate a memory extension request to the second device. The memory extension request includes the second start virtual address and the length of the physical address allowed to be accessed by the first device; and a first establishment module, configured to: if the second device successfully allocates the target memory space for the first device in response to the memory extension request, establish the first mapping relationship on the first device. The target memory space is a memory space in an idle state in the memory of the second device; and the length of the physical address of the target memory space is equal to the length of the physical address allowed to be accessed by the first device.

In one example embodiment, the sending module includes:

a first determination unit, configured to determine an address interval between the first start physical address and the start physical address allowed to be accessed by the first device in the first mapping relationship as a physical address offset, and carry the physical address offset in the data access request; and send the data access request to the second device; or a third processing unit, configured to carry the first start physical address in the data access request, and send the data access request to the second device.

In one example embodiment, the sending module includes:

a fourth sending unit, configured to: if P mapping relationships are predetermined and are in one-to-one correspondence with preestablished P communication tasks, send the data access request to the second device through a communication task of the P communication tasks that corresponds to the first mapping relationship. P is a positive integer greater than or equal to 2, and the P mapping relationships include the first mapping relationship.

Another data access apparatus provided by an embodiment of the present application includes:

a second obtaining module, configured to obtain a data access request sent by a first device. The data access request is configured to request access to a target memory space in a memory of a second device, and the target memory space is a memory space allowed to be accessed by the first device;

a second determination module, configured to: if the data access request includes a second start virtual address corresponding to the target memory space, a length of a physical address to be accessed, and access instruction information, determine, according to a predetermined second mapping relationship, the second start virtual address, and the length of the physical address to be accessed, a memory space to be accessed in the target memory space. The second start virtual address is a virtual address determined according to a predetermined first mapping relationship and a first start physical address to be accessed by a processor in the first device; the first mapping relationship is at least a mapping relationship between a start physical address allowed to be accessed by the first device, a length of a physical address allowed to be accessed by the first device, and a second start virtual address corresponding to the target memory space; the second mapping relationship is at least a mapping relationship between a second start virtual address, a start physical address of the target memory space, and a length of a physical address of the target memory space; the first start physical address is a physical address determined according to a predetermined third mapping relationship and a first start virtual address to be accessed by the processor in the first device; and the third mapping relationship is at least a mapping relationship between a start virtual address allowed to be accessed by the first device and a start physical address allowed to be accessed by the first device; and an execution module, configured to perform an access operation indicated by the access instruction information on the memory space to be accessed.

By the steps above, the memory space allowed to be accessed by the first device is allocated for the first device from the idle memory space in the memory of the second device. The first mapping relationship and the second mapping relationship are predetermined. If the second device obtains the data access request sent by the first device, the memory space to be accessed in the memory space allowed to be accessed by the first device in the memory of the second device can be determined according to the predetermined second mapping relationship, the second start virtual address, and the length of the physical address to be accessed, and then the process of the access operation indicated by the access instruction information can be performed on the memory space to be accessed. In such a way, direct addressing and access to the extended memory of the first device on the second device are realized. Therefore, the problem that the first device cannot access the memory space in the memory of the second device that is allowed to be accessed by the first device is solved, thereby achieving the effect that the first device may access the memory space in the memory of the second device that is allowed to be accessed by the first device.

In one example embodiment, the second determination module includes:

a second determination unit, configured to: if the data access request further includes the first start physical address, determine an address interval between the first start physical address and the start physical address allowed to be accessed by the first device in the first mapping relationship as a physical address offset;

a third determination unit, configured to determine, according to the second physical address offset, the second mapping relationship, and the physical address offset, a start physical address of the memory space to be accessed in the target memory space; and a fourth determination unit, configured to determine, according to the second mapping relationship, the start physical address of the memory space to be accessed, and the length of the physical address to be accessed, the memory space to be accessed in the target memory space.

In one example embodiment, the second determination module includes:

a fifth determination unit, configured to: if the data access request further includes a physical address offset, determine, according to the second start virtual address, the second mapping relationship, and the physical address offset, a start physical address of the memory space to be accessed in the target memory space. The physical address offset is an address interval between the first start physical address and the start physical address allowed to be accessed by the first device in the first mapping relationship; and a sixth determination unit, configured to determine, according to the second mapping relationship, the start physical address of the memory space to be accessed, and the length of the physical address to be accessed, the memory space to be accessed in the target memory space.

In one example embodiment, the third determination unit is configured to:

if the target memory space includes N discontinuous memory spaces, determine, according to the second mapping relationship, a start physical address of a first memory space of the N memory spaces that has a mapping relationship with the second start virtual address, N is a positive integer greater than or equal to 2; i is a positive integer greater than or equal to 1 and less than or equal to N; the second mapping relationship is a mapping relationship represented by an array linked list; a head of the array linked list includes the second start virtual address; and an i-th linked list unit in the array linked list includes a start physical address of an i-th memory space of the N memory spaces, a length of a physical address of the i-th memory space, and a start physical address of next memory space to the i-th memory space; and determine, according to the start physical address of the first memory space and the physical address offset, the start physical address of the memory space to be accessed in the target memory space. An address interval between the start physical address of the first memory space and the start physical address of the memory space to be accessed is equal to the physical address offset; and an address interval between an end physical address of a previous memory space and a start physical address of a latter memory space of the N memory spaces is regarded as 1.

In one example embodiment, the fourth determination unit is configured to:

determine, according to the second mapping relationship, the start physical address of the memory space to be accessed, and the length of the physical address to be accessed, an end physical address of the memory space to be accessed in the target memory space An address interval between the start physical address of the memory space to be accessed and the end physical address of the memory space to be accessed is equal to the length of the physical address to be accessed; and determine, in the target memory space, a corresponding memory space from the start physical address of the memory space to be accessed to the end physical address of the memory space to be accessed as the memory space to be accessed.

In one example embodiment, the fifth determination unit is configured to:
- if the target memory space includes one memory space, determine, according to the second mapping relationship, a start physical address of the one memory space of the target memory space that has a mapping relationship with the second start virtual address. The second mapping relationship is at least a mapping relationship between a second start virtual address, a start physical address of the one memory space, and a length of a physical address of the one memory space; and
- determine, according to the start physical address of the one memory space and the physical address offset, the start physical address of the memory space to be accessed in the target memory space. An address interval between the start physical address of the one memory space and the start physical address of the memory space to be accessed is equal to the physical address offset.

In one example embodiment, the execution module includes:
- an execution unit, configured to: if the access instruction information indicates a read operation, perform the read operation on the memory space to be accessed to obtain read data;
- a splitting unit, configured to split the read data into M data packets according to a transmission protocol between the dispose second and the second device. M is a positive integer greater than or equal to 1; and
- a fifth sending unit, configured to send the M data packets to the first device.

In one example embodiment, the execution module includes:
- a writing unit, configured to: if the access instruction information indicates a write operation and the data access request further includes data to be written, write the data to be written to the memory space to be accessed; or a sixth sending unit, configured to: if the access instruction information indicates the write operation and the data access request includes no data to be written, send indication information to the first device. The indication information is configured to: represent that the second device is ready for performing the write operation; obtain M data packets sent by the first device. The M data packets are data packets obtained by splitting the data to be written according to a transmission protocol between the first device and the second device, and M is a positive integer greater than or equal to 1; pack the M data packets to obtain the data to be written; and write the data to be written to the memory space to be accessed.

In one example embodiment, the apparatus further includes:
- a third determination module, configured to: before obtaining the data access request sent by the first device, determine the target memory space in an idle state in the memory of the second device in response to a memory extension request sent by the first device. The memory extension request includes the second start virtual address and the length of the physical address allowed to be accessed by the first device; and the length of the physical address of the target memory space is equal to the length of the physical address allowed to be accessed by the first device; and
- a second establishment module, configured to establish a mapping relationship between a second start physical address, a start physical address of the target memory space, and a length of a physical address of the target memory space to obtain the second mapping relationship.

In one example embodiment, the second establishment module includes:
- an establishment unit, configured to: if the target memory space includes N discontinuous memory spaces, establish an array linked list for representing the second mapping relationship, N is a positive integer greater than or equal to 2; i is a positive integer greater than or equal to 1 and less than or equal to N; a head of the array linked list includes the second start virtual address; and an i-th linked list unit in the array linked list includes a start physical address of an i-th memory space of the N memory spaces, a length of a physical address of the i-th memory space, and a start physical address of next memory space to the i-th memory space.

It should be noted that each of the modules above may be realized by software or hardware. In the case of the hardware, the modules may be realized, but is not limited thereby, in the following way: all the modules are in the same processor; or the modules are separately in different processors in the form of any combinations.

An embodiment of the present application further provides a non-volatile readable storage medium storing a computer program therein. The computer program is configured to perform the steps in any of the method embodiments above when executed.

In an example embodiment, the non-volatile readable storage medium may include, but is not limited to various media that can store computer programs, such as a USB flash disk, a read-only memory (ROM), a random access memory (RAM), a mobile hard disk, a magnetic disk, or an optical disk.

An embodiment of the present application further provides an electronic device including a memory and a processor. The memory stores a computer program, and the processor is configured to run the computer program to perform the steps in any of the method embodiments above.

In an example embodiment, the electronic device may further include a transmission apparatus and an input-output apparatus. The transmission apparatus is connected with the processor, and the input-output apparatus is connected with the processor.

Examples in this embodiment can be referred to the examples described in the embodiments and example implementations above, which are no longer repeated herein.

Obviously, those skilled in the art should understand that the modules or steps in the embodiments of the present application may be implemented with a general-purpose computing device. The modules or steps may be centralized on a single computing device or distributed on a network consisting of a plurality of computing devices, may be implemented with program codes executable by the computing device, and thus may be stored in a storage device and executed by the computing device. Moreover, in some cases, the steps shown or described may be performed in an order different from the order here or may be separately produced as individual integrated circuit modules, or a plurality of the modules or steps may be produced as a single integrated circuit module. As such, the embodiments of the present application are not limited to any particular combination of hardware and software.

The embodiments above are just embodiments of the present application and are not used for limiting the embodiments of the present application. For those skilled in the art, the present application may have various modifications and variations. Any modification, equivalent replacement, improvement, etc. made within the principle of the embodiments of the present application should be included in the protection scope of the embodiments of the present application.

What is claimed is:

1. A method for direct access of remote memory, comprising:
   obtaining a first start physical address to be accessed by a processor in a first device and a length of a physical address to be accessed, wherein the first start physical address is a physical address determined according to a predetermined third mapping relationship and a first start virtual address to be accessed by the processor in the first device, and the third mapping relationship is at least a mapping relationship between a start virtual address allowed to be accessed by the first device and a start physical address allowed to be accessed by the first device;
   determining, according to a predetermined first mapping relationship and the first start physical address, a second start virtual address corresponding to a target memory space, wherein the first mapping relationship is at least a mapping relationship between a start physical address allowed to be accessed by the first device, a length of a physical address allowed to be accessed by the first device, and a second start virtual address corresponding to the target memory space; and the target memory device is a memory space in a memory of a second device and a memory space allowed to be accessed by the first device; and
   sending a data access request to the second device, wherein the data access request is configured to request access to the target memory space in the memory of the second device, the data access request comprises the second start virtual address, the length of the physical address to be accessed, and access instruction information, the access instruction information is configured to indicate that a read operation or a write operation is performed on a memory space to be accessed in the target memory space; the memory space to be accessed is a memory space in the target memory space that is determined according to a predetermined second mapping relationship, the second start virtual address, and the length of the physical address to be accessed; and the second mapping relationship is at least a mapping relationship between a second start virtual address, a start physical address of the target memory space, and a length of a physical address of the target memory space.

2. The method for direct access of remote memory according to claim 1, wherein sending a data access request to the second device comprises:
   in response to the first start physical address being a start physical address to be read by the processor and a first data set corresponding to the first start physical address and the length of the physical address to be accessed not being cached in a cache space of the first device, sending the data access request to the second device, wherein the first data set comprises data obtained by performing the read operation on the memory space to be accessed in advance.

3. The method for direct access of remote memory according to claim 2, wherein after sending a data access request to the second device, the method for direct access of remote memory further comprises:
   in response to the access instruction information indicating the read operation, receiving M data packets sent by the second device, wherein the M data packets are data packets obtained by splitting read data according to a transmission protocol between the first device and the second device; the read data is data obtained by the second device performing the read operation on the memory space to be accessed; and M is a positive integer greater than or equal to 1;
   packing the M data packets to obtain the first data set; and
   caching the first start physical address, the length of the physical address to be accessed, and the first data set into the cache space of the first device.

4. The method for direct access of remote memory according to claim 1, wherein sending a data access request to the second device comprises:
   in response to the first start physical address being a start physical address to be written by the processor and a first data set corresponding to the first start physical address and the length of the physical address to be accessed being cached in a cache space of the first device, modifying the first data set cached in the cache space of the first device to a second data set to be written by the processor, and sending the data access request to the second device, wherein the first data set comprises data obtained by performing the read operation on the memory space to be accessed; or
   in response to the first start physical address being the start physical address to be written by the processor and the first data set corresponding to the first start physical address and the length of the physical address to be accessed not being cached in the cache space of the first device, obtaining the first data set from the second device, caching the first data set into the cache space of the first device, modifying the first data set cached in the cache space of the first device to the second data set to be written by the processor, and sending the data access request to the second device.

5. The method for direct access of remote memory according to claim 4, wherein sending the data access request to the second device comprises:
   in response to the cache space being full, sending the data access request to the second device, wherein the data access request is configured to request to perform the write operation on the target memory space; or
   in response to the first data set cached in the cache space of the first device being successfully modified to the second data set to be written by the processor, sending the data access request to the second device.

6. The method for direct access of remote memory according to claim 4, further comprising:
   in response to the first data set cached in the cache space of the first device being modified to the second data set to be written by the processor, setting a modification tag for the second data set in the cache space; and
   in response to the cache space being full, or in response to the cache space being full and data to be cached into the cache space existing, deleting at least part of data without the modification tag from the cache space.

7. The method for direct access of remote memory according to claim 1, wherein before sending a data access request to the second device, the method for direct access of remote memory further comprises:
   initiating a memory extension request to the second device, wherein the memory extension request comprises the second start virtual address and the length of the physical address allowed to be accessed by the first device; and in response to the second device successfully allocating the target memory space for the first device in response to the memory extension request, establishing the first mapping relationship on the first device, wherein the target memory space is a memory space in an idle state in the memory of the second device; and the length of the physical address of the target memory space is equal to the length of the physical address allowed to be accessed by the first device.

8. The method for direct access of remote memory according to claim 1, wherein sending a data access request to the second device comprises:

determining an address interval between the first start physical address and the start physical address allowed to be accessed by the first device in the first mapping relationship as a physical address offset, and carrying the physical address offset in the data access request; and sending the data access request to the second device; or carrying the first start physical address in the data access request; and sending the data access request to the second device.

9. The method for direct access of remote memory according to claim 1, wherein sending a data access request to the second device comprises:

in response to P mapping relationships being predetermined and being in one-to-one correspondence with preestablished P communication tasks, sending the data access request to the second device through a communication task of the P communication tasks that corresponds to the first mapping relationship, wherein P is a positive integer greater than or equal to 2, and the P mapping relationships comprise the first mapping relationship.

10. A method for direct access of remote memory, comprising:

obtaining a data access request sent by a first device, wherein the data access request is configured to request access to a target memory space in a memory of a second device, and the target memory space is a memory space allowed to be accessed by the first device;

in response to the data access request comprising a second start virtual address corresponding to the target memory space, a length of a physical address to be accessed, and access instruction information, determining, according to a predetermined second mapping relationship, the second start virtual address, and the length of the physical address to be accessed, a memory space to be accessed in the target memory space, wherein the second start virtual address is a virtual address determined according to a predetermined first mapping relationship and a first start physical address to be accessed by a processor in the first device; the first mapping relationship is at least a mapping relationship between a start physical address allowed to be accessed by the first device, a length of a physical address allowed to be accessed by the first device, and a second start virtual address corresponding to the target memory space; the second mapping relationship is at least a mapping relationship between a second start virtual address, a start physical address of the target memory space, and a length of a physical address of the target memory space; the first start physical address is a physical address determined according to a predetermined third mapping relationship and a first start virtual address to be accessed by the processor in the first device; and the third mapping relationship is at least a mapping relationship between a start virtual address allowed to be accessed by the first device and a start physical address allowed to be accessed by the first device; and performing an access operation indicated by the access instruction information on the memory space to be accessed.

11. The method for direct access of remote memory according to claim 10, wherein determining, according to a predetermined second mapping relationship, the second start virtual address, and the length of the physical address to be accessed, a memory space to be accessed in the target memory space comprises:

in response to the data access request further comprising the first start physical address, determining an address interval between the first start physical address and the start physical address allowed to be accessed by the first device in the first mapping relationship as a physical address offset;

determining, according to the second start virtual address, the second mapping relationship, and the physical address offset, a start physical address of the memory space to be accessed in the target memory space; and determining, according to the second mapping relationship, the start physical address of the memory space to be accessed, and the length of the physical address to be accessed, the memory space to be accessed in the target memory space.

12. The method for direct access of remote memory according to claim 10, wherein determining, according to a predetermined second mapping relationship, the second start virtual address, and the length of the physical address to be accessed, a memory space to be accessed in the target memory space comprises:

in response to the data access request further comprising a physical address offset, determining, according to the second start virtual address, the second mapping relationship, and the physical address offset, a start physical address of the memory space to be accessed in the target memory space, wherein the physical address offset is an address interval between the first start physical address and the start physical address allowed to be accessed by the first device in the first mapping relationship; and determining, according to the second mapping relationship, the start physical address of the memory space to be accessed, and the length of the physical address to be accessed, the memory space to be accessed in the target memory space.

13. The method for direct access of remote memory according to claim 11, wherein determining, according to the second start virtual address, the second mapping relationship, and the physical address offset, a start physical address of the memory space to be accessed in the target memory space comprises:

in response to the target memory space comprising N discontinuous memory spaces, determining, according to the second mapping relationship, a start physical address of a first memory space of the N memory spaces that has a mapping relationship with the second start virtual address, wherein N is a positive integer greater than or equal to 2; i is a positive integer greater than or equal to 1 and less than or equal to N; the second mapping relationship is a mapping relationship represented by an array linked list; a head of the array linked list comprises the second start virtual address; and an i-th linked list unit in the array linked list comprises a start physical address of an i-th memory space of the N memory spaces, a length of a physical address of the i-th memory space, and a start physical address of next memory space to the i-th memory space; and determining, according to the start physical address of the first memory space and the physical address offset, the start physical address of the memory space to be accessed in the target memory space, wherein an address interval between the start physical address of the first memory space and the start physical address of the memory space to be accessed is equal to the physical address offset; and an address interval between an end physical address of a previous memory space and a start physical address of a latter memory space of the N memory spaces is regarded as 1.

14. The method for direct access of remote memory according to claim 13, wherein determining, according to the second mapping relationship, the start physical address of the memory space to be accessed, and the length of the physical address to be accessed, the memory space to be accessed in the target memory space comprises:

determining, according to the second mapping relationship, the start physical address of the memory space to be accessed, and the length of the physical address to be accessed, an end physical address of the memory space to be accessed in the target memory space, wherein an address interval between the start physical address of the memory space to be accessed and the end physical address of the memory space to be accessed is equal to the length of the physical address to be accessed; and determining, in the target memory space, a corresponding memory space from the start physical address of the memory space to be accessed to the end physical address of the memory space to be accessed as the memory space to be accessed.

15. The method for direct access of remote memory according to claim 11, wherein determining, according to the second start virtual address, the second mapping relationship, and the physical address offset, a start physical address of the memory space to be accessed in the target memory space comprises:

in response to the target memory space comprising one memory space, determining, according to the second mapping relationship, a start physical address of the one memory space of the target memory space that has a mapping relationship with the second start virtual address, wherein the second mapping relationship is at least a mapping relationship between a second start virtual address, a start physical address of the one memory space, and a length of a physical address of the one memory space; and determining, according to the start physical address of the one memory space and the physical address offset, the start physical address of the memory space to be accessed in the target memory space, wherein an address interval between the start physical address of the one memory space and the start physical address of the memory space to be accessed is equal to the physical address offset.

16. The method for direct access of remote memory according to claim 10, wherein performing an access operation indicated by the access instruction information on the memory space to be accessed comprises:

in response to the access instruction information indicating a read operation, performing the read operation on the memory space to be accessed to obtain read data;

splitting the read data into M data packets according to a transmission protocol between the first device and the second device, wherein M is a positive integer greater than or equal to 1; and sending the M data packets to the first device.

17. The method for direct access of remote memory according to claim 10, wherein performing an access operation indicated by the access instruction information on the memory space to be accessed comprises:

in response to the access instruction information indicating a write operation and the data access request further comprising data to be written, writing the data to be written to the memory space to be accessed; or in response to the access instruction information indicating the write operation and the data access request comprising no data to be written, sending indication information to the first device, wherein the indication information is configured to represent that the second device is ready for performing the write operation; obtaining M data packets sent by the first device, wherein the M data packets are data packets obtained by splitting the data to be written according to a transmission protocol between the first device and the second device, and M is a positive integer greater than or equal to 1; packing the M data packets to obtain the data to be written; and writing the data to be written to the memory space to be accessed.

18. The method for direct access of remote memory according to claim 10, wherein before obtaining a data access request sent by a first device, the method for direct access of remote memory further comprises:

determining, in response to a memory extension request sent by the first device, the target memory space in an idle state in the memory of the second device, wherein the memory extension request comprises the second start virtual address and the length of the physical address allowed to be accessed by the first device; and the length of the physical address of the target memory space is equal to the length of the physical address allowed to be accessed by the first device; and establishing a mapping relationship between a second start virtual address, a start physical address of the target memory space, and a length of a physical address of the target memory space to obtain the second mapping relationship.

19. The method for direct access of remote memory according to claim 18, wherein establishing a mapping relationship between a second start virtual address, a start physical address of the target memory space, and a length of a physical address of the target memory space to obtain the second mapping relationship comprises:

in response to the target memory space comprising N discontinuous memory spaces, establishing an array linked list for representing the second mapping relationship, wherein N is a positive integer greater than or equal to 2; i is a positive integer greater than or equal to 1 and less than or equal to N; a head of the array linked list comprises the second start virtual address; and an i-th linked list unit in the array linked list comprises a start physical address of an i-th memory space of the N memory spaces, a length of a physical address of the i-th memory space, and a start physical address of next memory space to the i-th memory space.

20. A device for direct access of remote memory, comprising a first processor, a main memory manager, a remote memory controller, and a first communication unit, wherein the first processor is connected to the main memory manager that is connected to the remote memory controller, and the remote memory controller is connected to the first communication unit, wherein the main memory manager is configured to determine, according to a predetermined third mapping relationship and a first start virtual address to be accessed by the first processor, a first start physical address to be accessed by the first processor, wherein the third mapping relationship is at least a mapping relationship between a start virtual address allowed to be accessed by the data access device and a start physical address allowed to be accessed by the data access device;

the remote memory controller is configured to determine, according to a predetermined first mapping relationship and the first start physical address, a second start virtual address corresponding to a target memory space, wherein the first mapping relationship is at least a mapping relationship between a start physical address allowed to be accessed by the data access device, a length of a physical address allowed to be accessed by the data access device, and a second start virtual address corresponding to the target memory space; and the target memory device is a memory space in a memory of a second device and a memory space allowed to be accessed by the data access device; and the first communication unit is configured to send a data access request to the second device, wherein the data access request is configured to request access to the target memory space in the memory of the second device and comprises the second start virtual address corresponding to the target memory space, a length of a physical address to be accessed, and access instruction information.

\* \* \* \* \*